(12) United States Patent
Ito

(10) Patent No.: US 8,082,346 B2
(45) Date of Patent: Dec. 20, 2011

(54) SERVICE PROVIDING SYSTEM COOPERATIVE WITH VOIP AND WEB ENVIRONMENTS AND A METHOD THEREFOR

(75) Inventor: Shinya Ito, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1281 days.

(21) Appl. No.: 11/113,157

(22) Filed: Apr. 25, 2005

(65) Prior Publication Data

US 2005/0246355 A1 Nov. 3, 2005

(30) Foreign Application Priority Data

Apr. 30, 2004 (JP) ................................ 2004-136347

(51) Int. Cl.
G06F 15/16 (2006.01)
(52) U.S. Cl. .................... 709/227; 379/201.12
(58) Field of Classification Search .................. 709/224, 709/227; 379/201.12, 221.05; 370/353–357
See application file for complete search history.

(56) References Cited

U.S. PATENT DOCUMENTS

| | | | |
|---|---|---|---|
| 5,524,253 A * | 6/1996 | Pham et al. | 709/202 |
| 6,343,311 B1 * | 1/2002 | Nishida et al. | 709/203 |
| 7,016,675 B1 * | 3/2006 | Schuster et al. | 455/433 |
| 7,120,687 B1 * | 10/2006 | Tessman et al. | 709/224 |
| 7,181,766 B2 * | 2/2007 | Bendinelli et al. | 726/15 |
| 7,433,954 B2 * | 10/2008 | Dolinar et al. | 709/226 |
| 2004/0044727 A1 * | 3/2004 | Abdelaziz et al. | 709/203 |
| 2005/0198217 A1 * | 9/2005 | Nguyen et al. | 709/220 |
| 2008/0086564 A1 * | 4/2008 | Putman et al. | 709/227 |

FOREIGN PATENT DOCUMENTS

JP 2003-141315 5/2003

OTHER PUBLICATIONS

RFC ( Request for Comments) 3261 defined by the IETF (International Engineering Task Force), Jun. 2002.
Anders Kristensen, "SIP Servlet API Version 1.0", Feb. 4, 2003.

* cited by examiner

*Primary Examiner* — Philip Chea
*Assistant Examiner* — Eric W Shepperd
(74) *Attorney, Agent, or Firm* — Rabin & Berdo, P.C.

(57) ABSTRACT

A communication system achieving the cooperation of communications between a SIP and a Web system through a cooperative manager. A call attempt manager of the SIP system is booted, responsive to a request from another call attempt manager, and a call attempt is registered in a SIP database. A result of the registration is sent to the Web system for display on a Web client. A task is entered and registered in a Web database. A connection or monitoring service is provided between SIP clients interconnected to the SIP system.

9 Claims, 32 Drawing Sheets

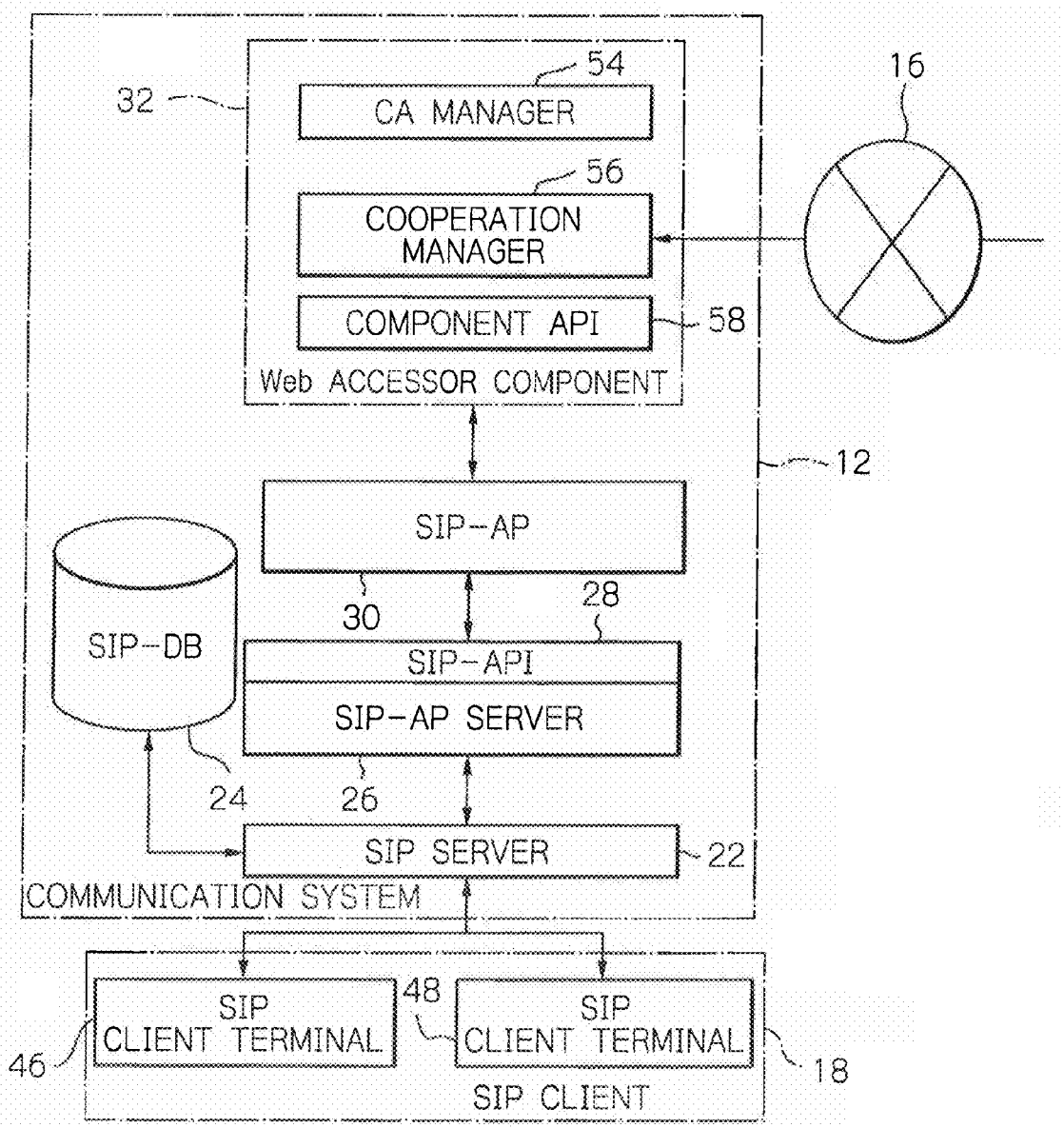

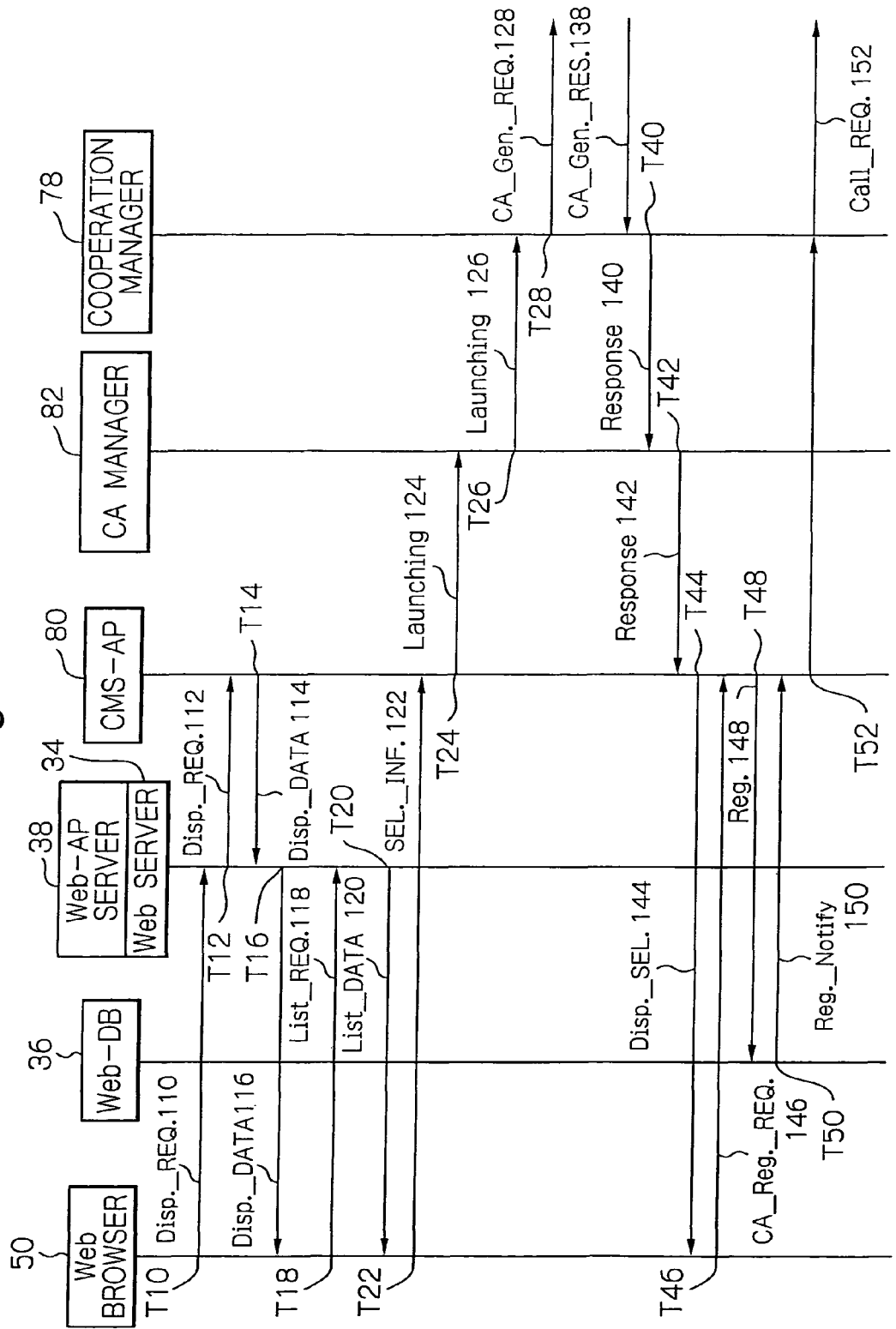

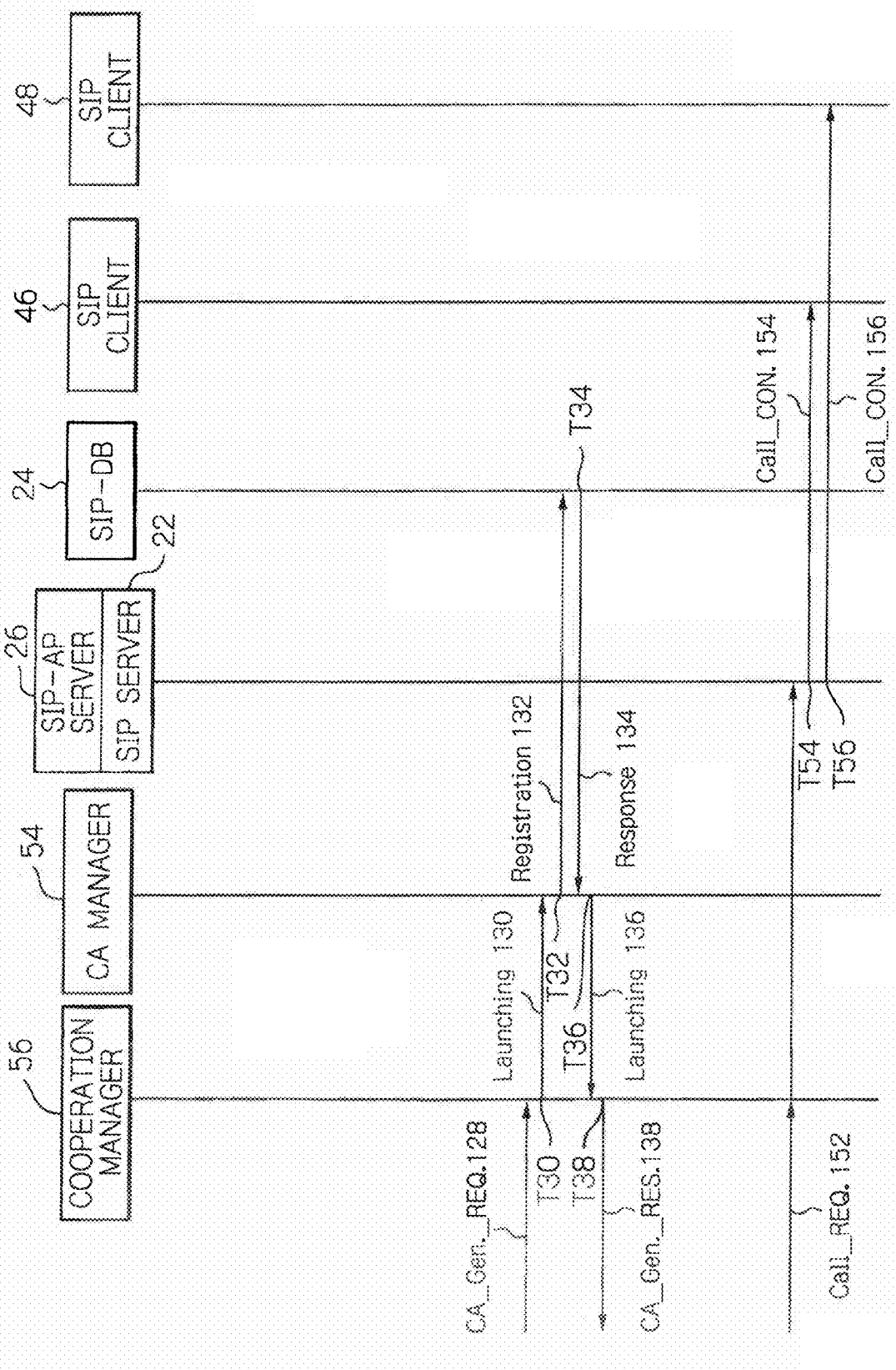

Fig. 4

| CA No. | REQUESTER | RECEIVER | BEGINNING TIME | END TIME | COMMUNI-CATION MEANS | STATUS |
|---|---|---|---|---|---|---|
| CA 1 | 46:SIPURI | 48:SIPURI | 8:10 | 8:12 | TELEPHONE | RE-REQUEST |
| CA 2 | 46:SIPURI | D :SIPURI | 9:00 | 9:05 | TELEPHONE | COMPLETION |
| CA 3 | 46:SIPURI | E :SIPURI | 10:05 | 10:08 | TELEPHONE | QUEUING FOR MESSAGE |
| | | | | | | |

Fig. 5

| CA No | TASK | REQUESTER |
|---|---|---|
| CA 1 | CONFIRM SCHEDULE PROPOSED BY FIRM S | 46 |
| CA 2 | REQUEST FOR CHANGE OF DATE AND TIME FOR HEALTH CHECK | 46 |
| CA 3 | REQUEST FOR LIQUIDATION OF TRAFFIC CHARGES | 46 |
| ⋮ | ⋮ | ⋮ |

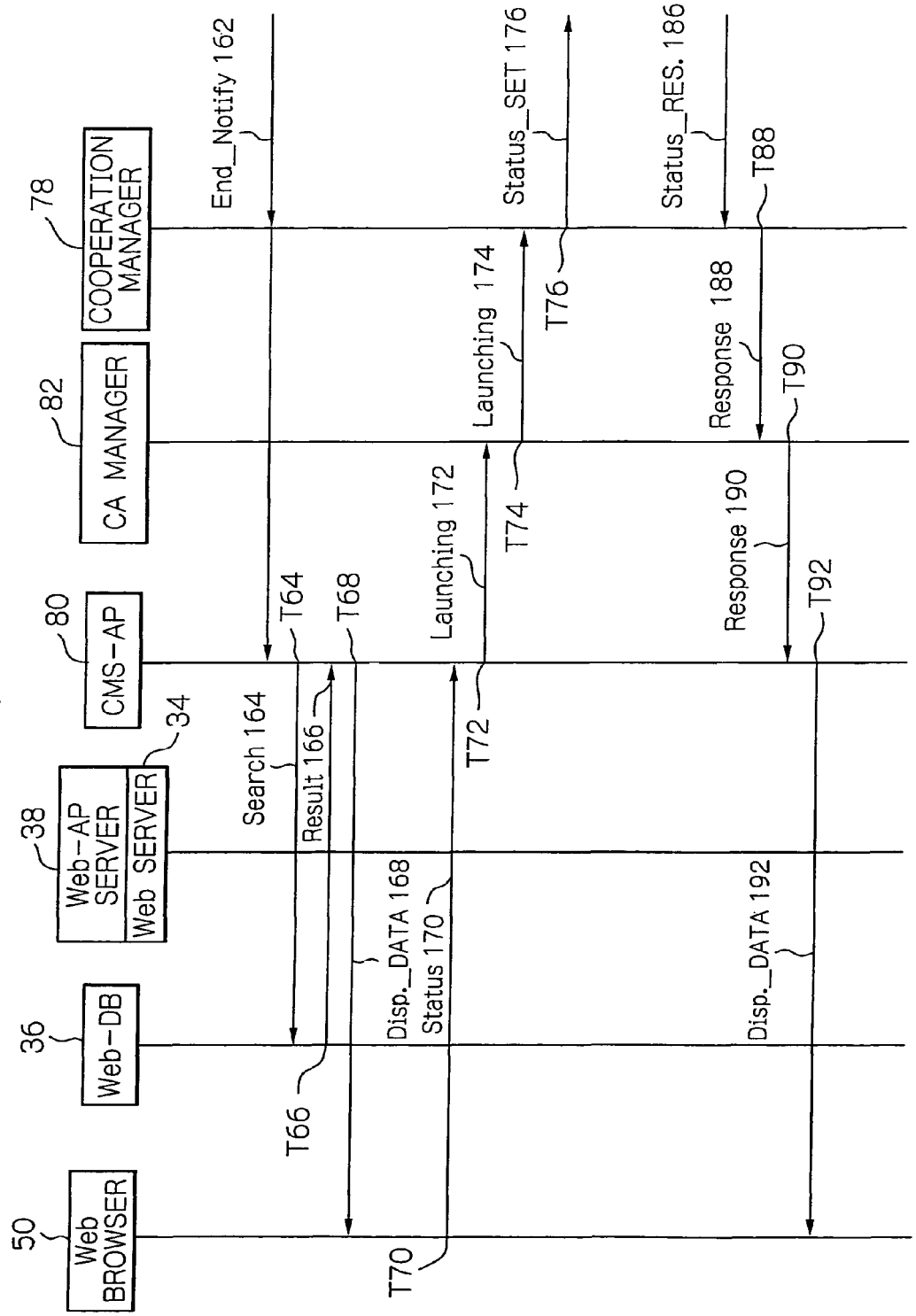

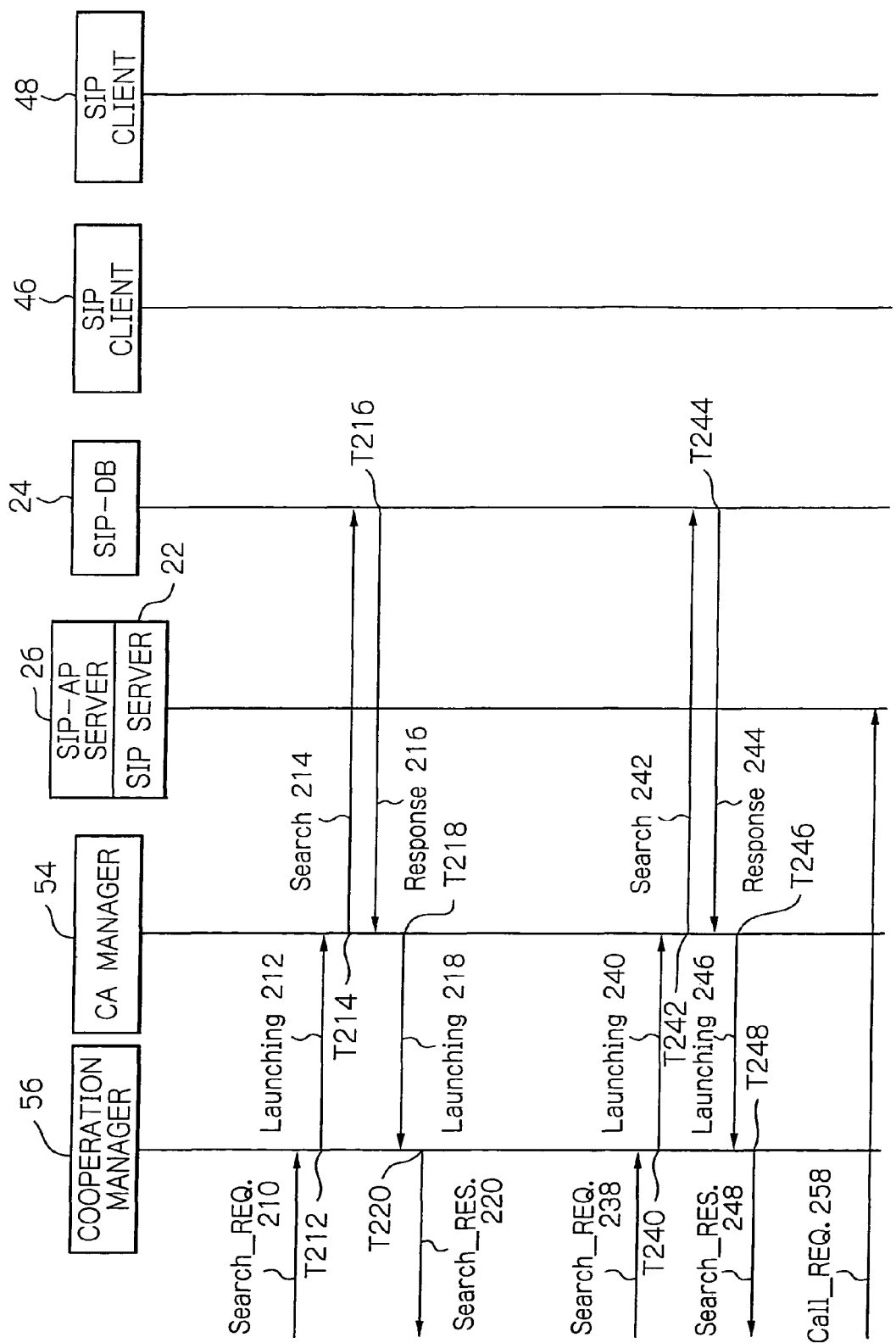

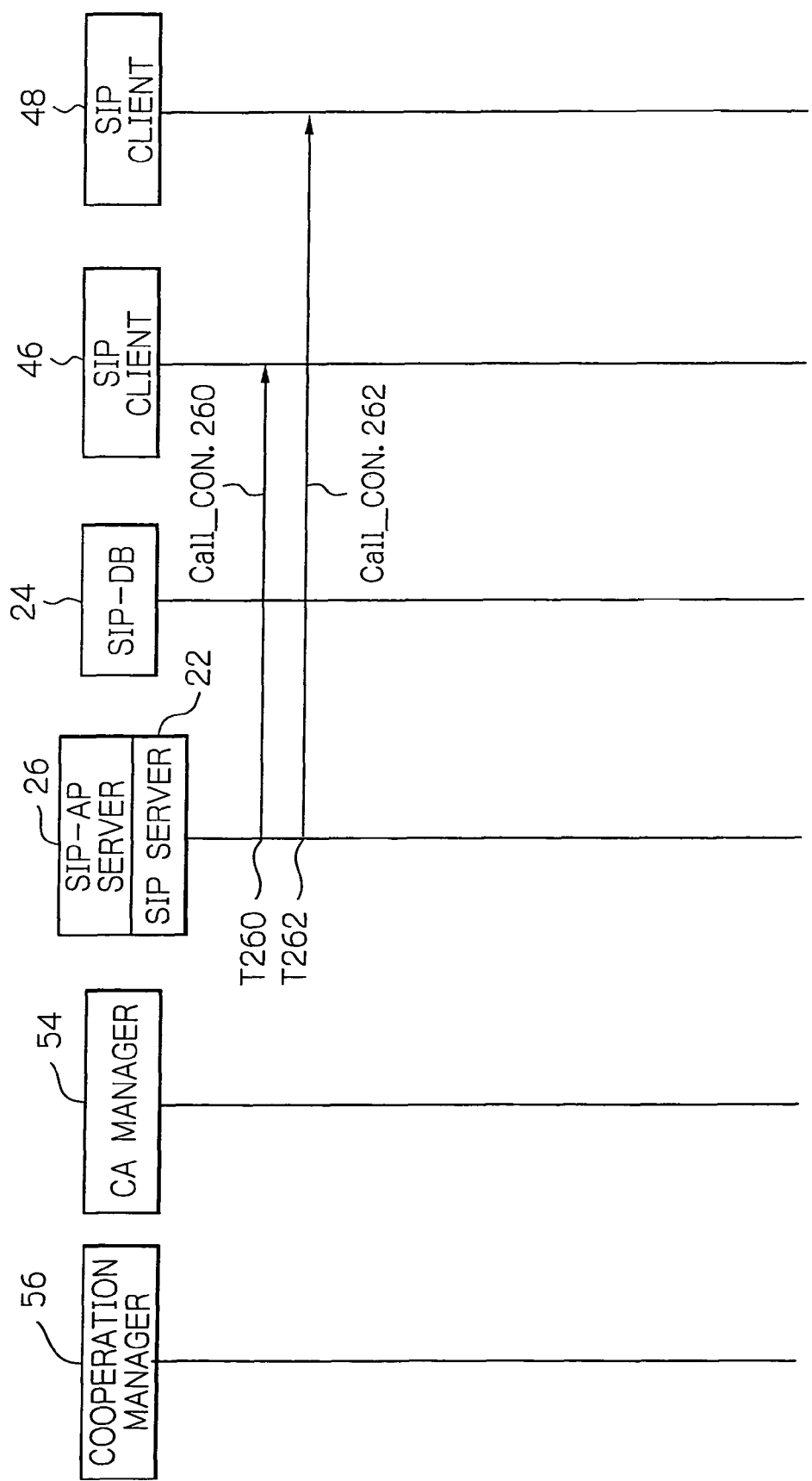

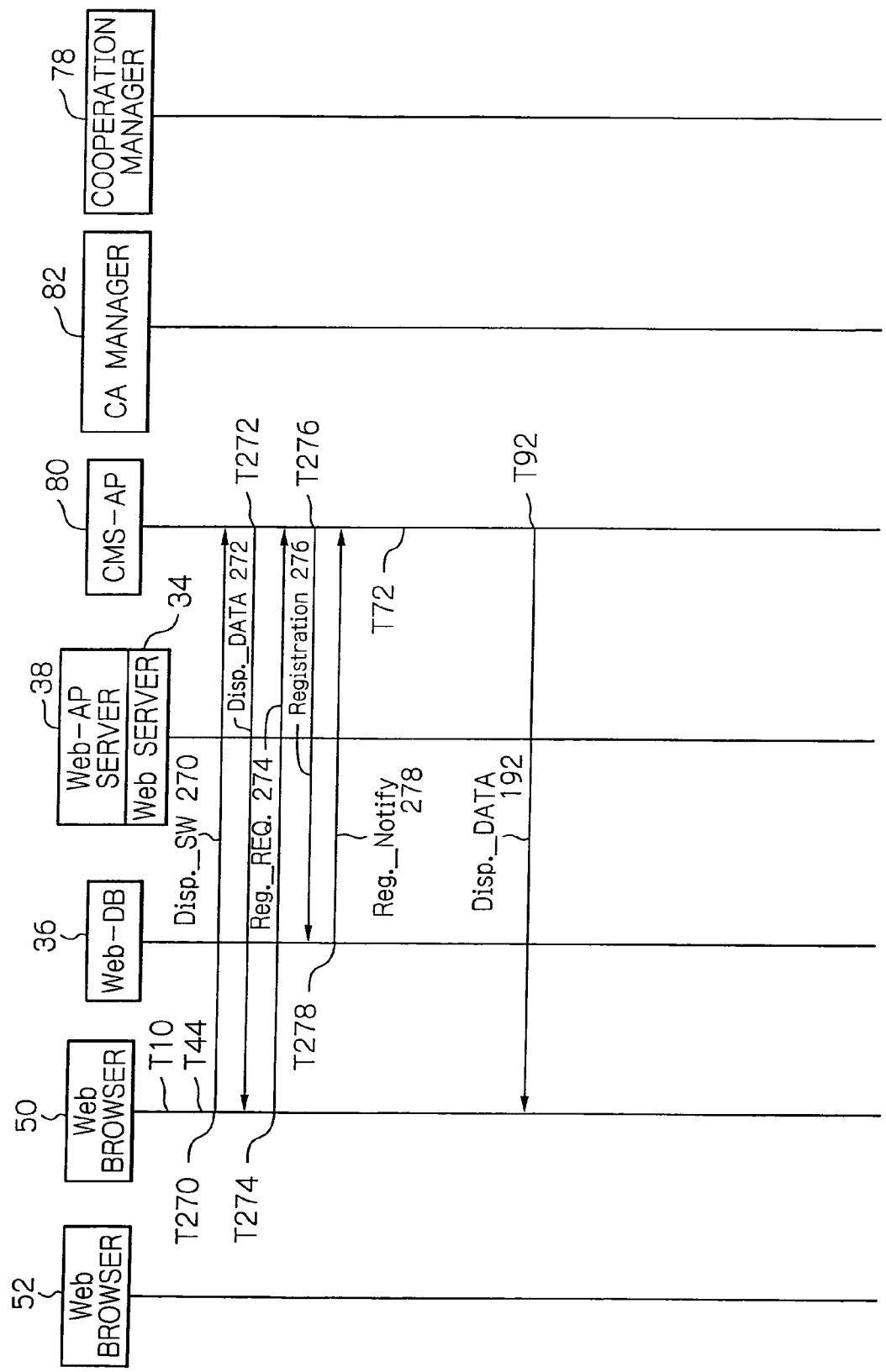

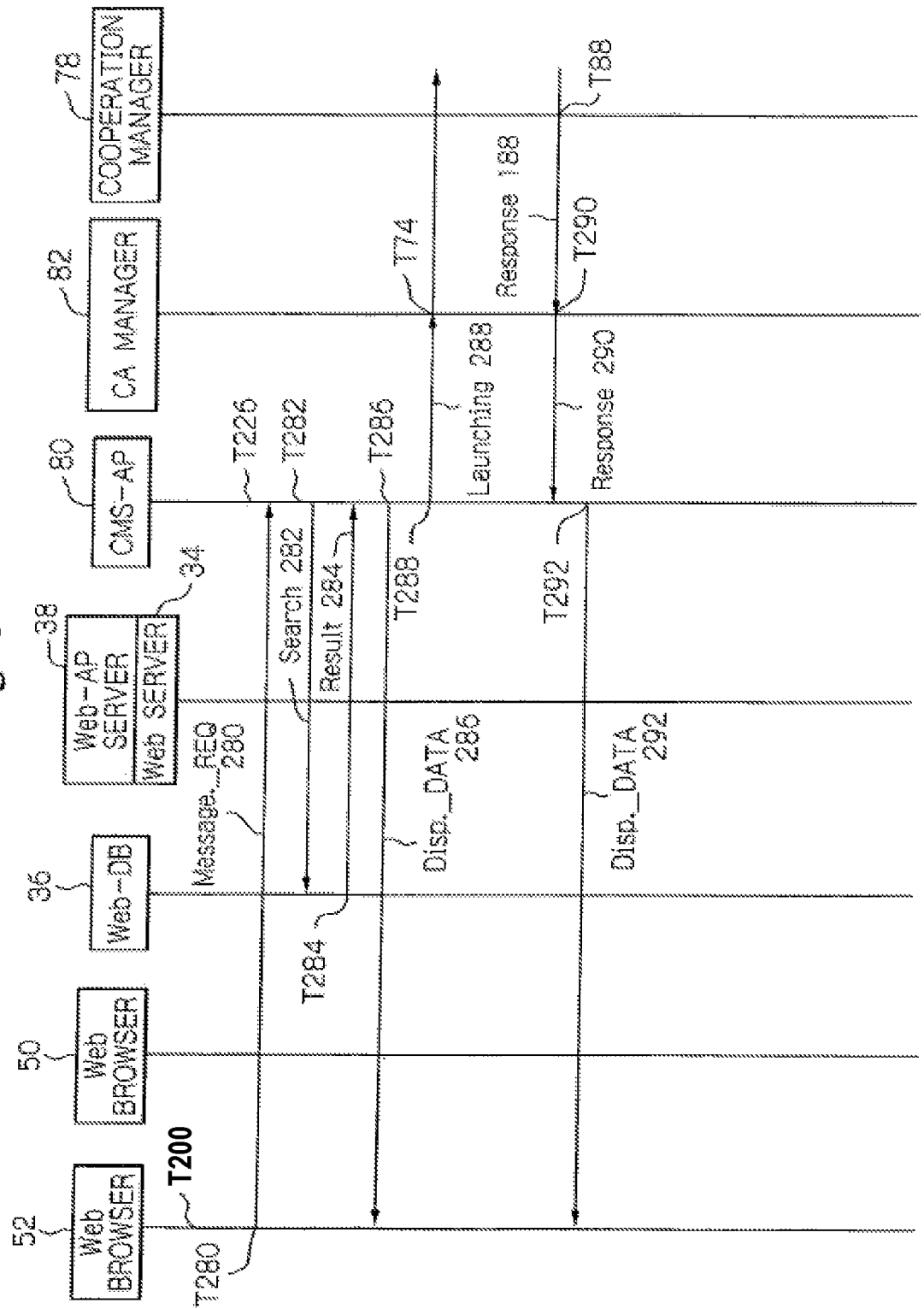

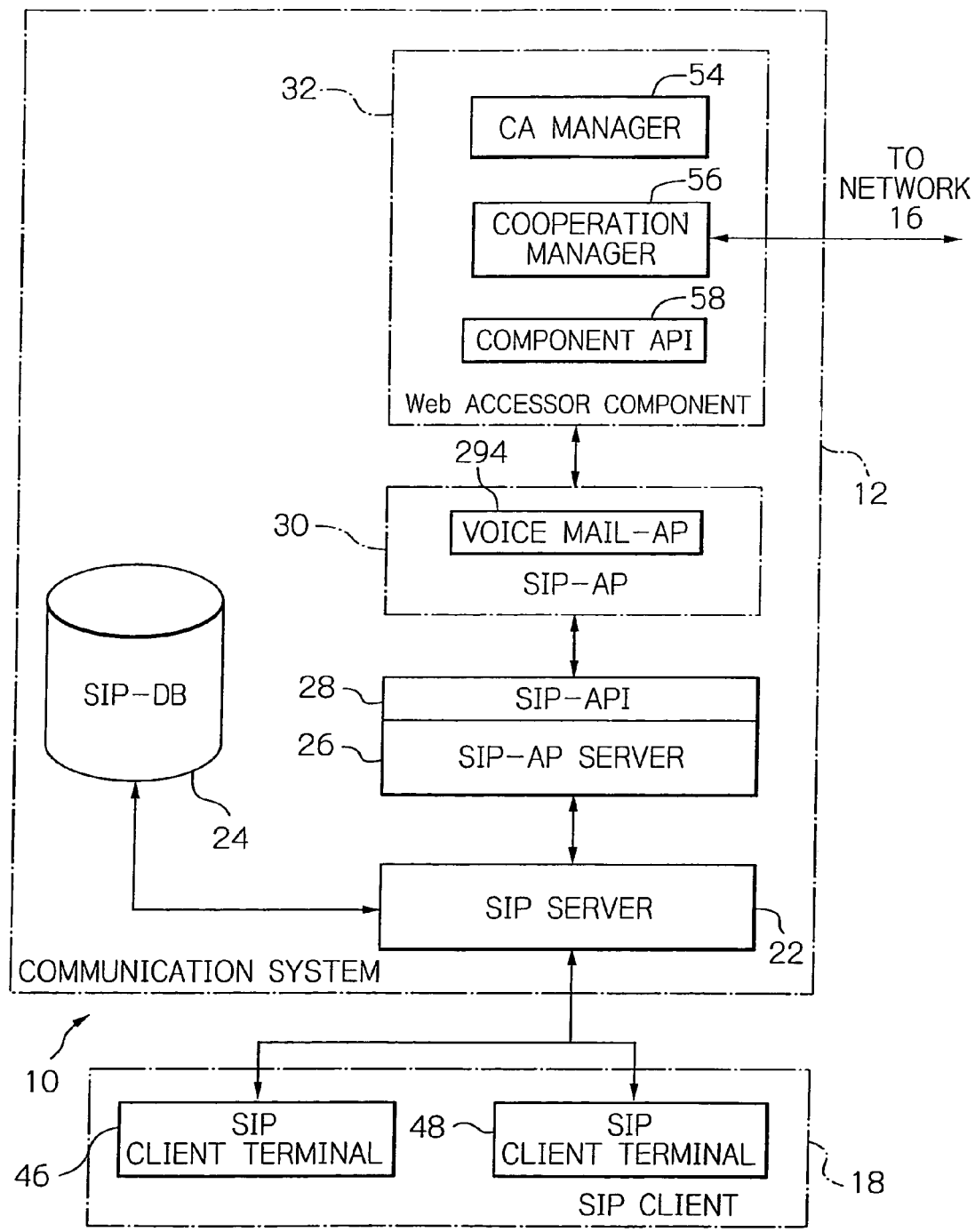

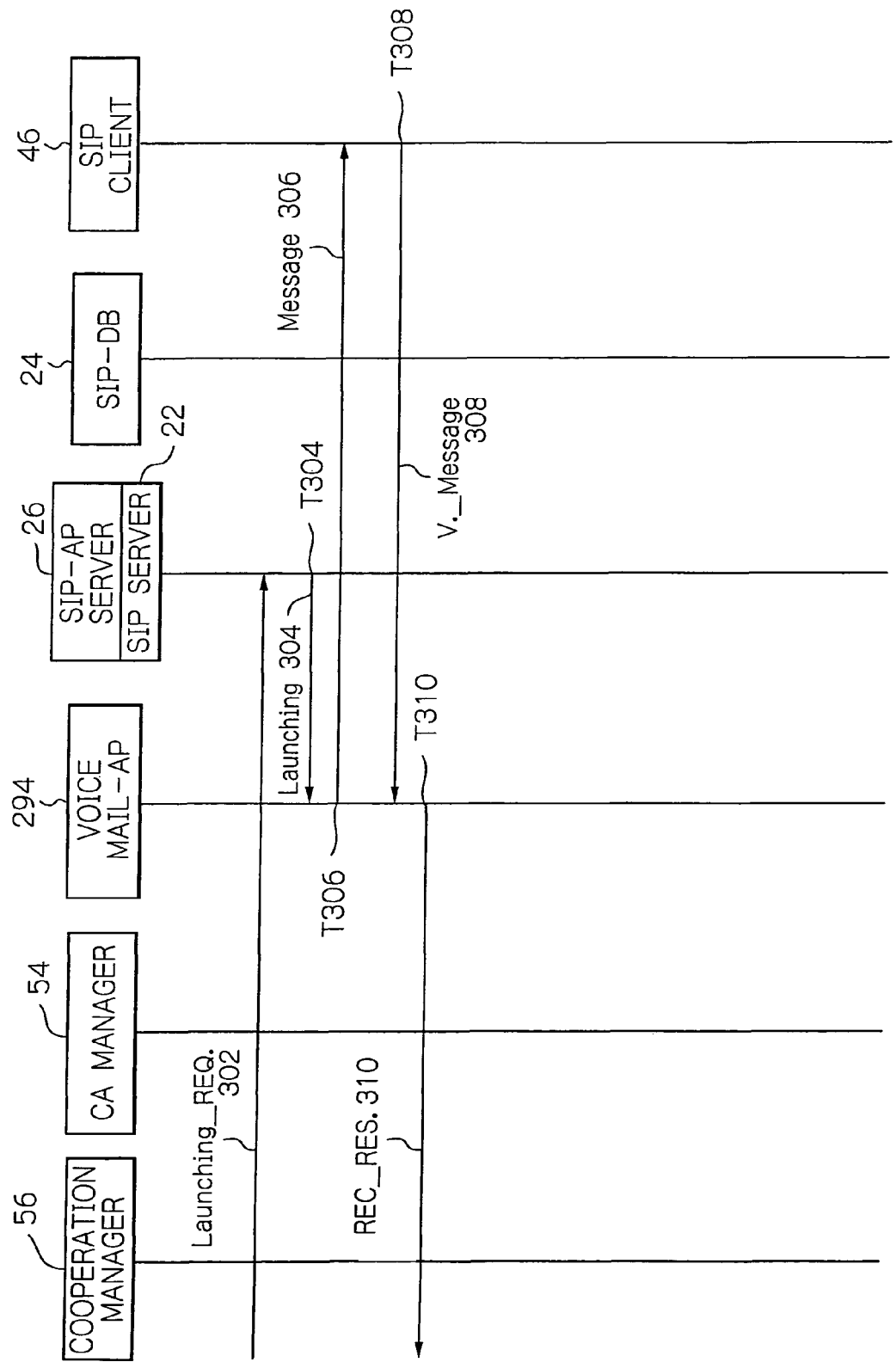

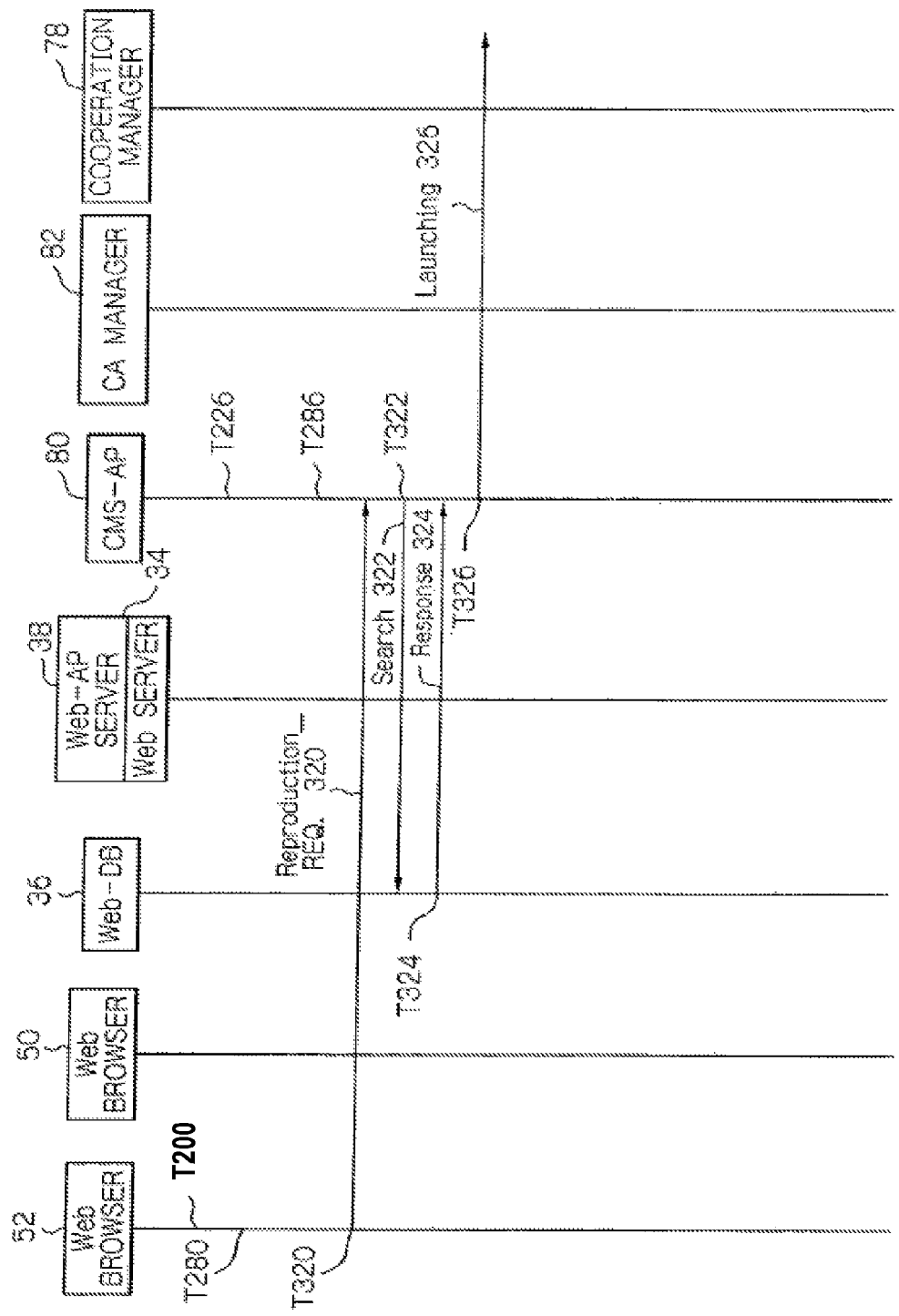

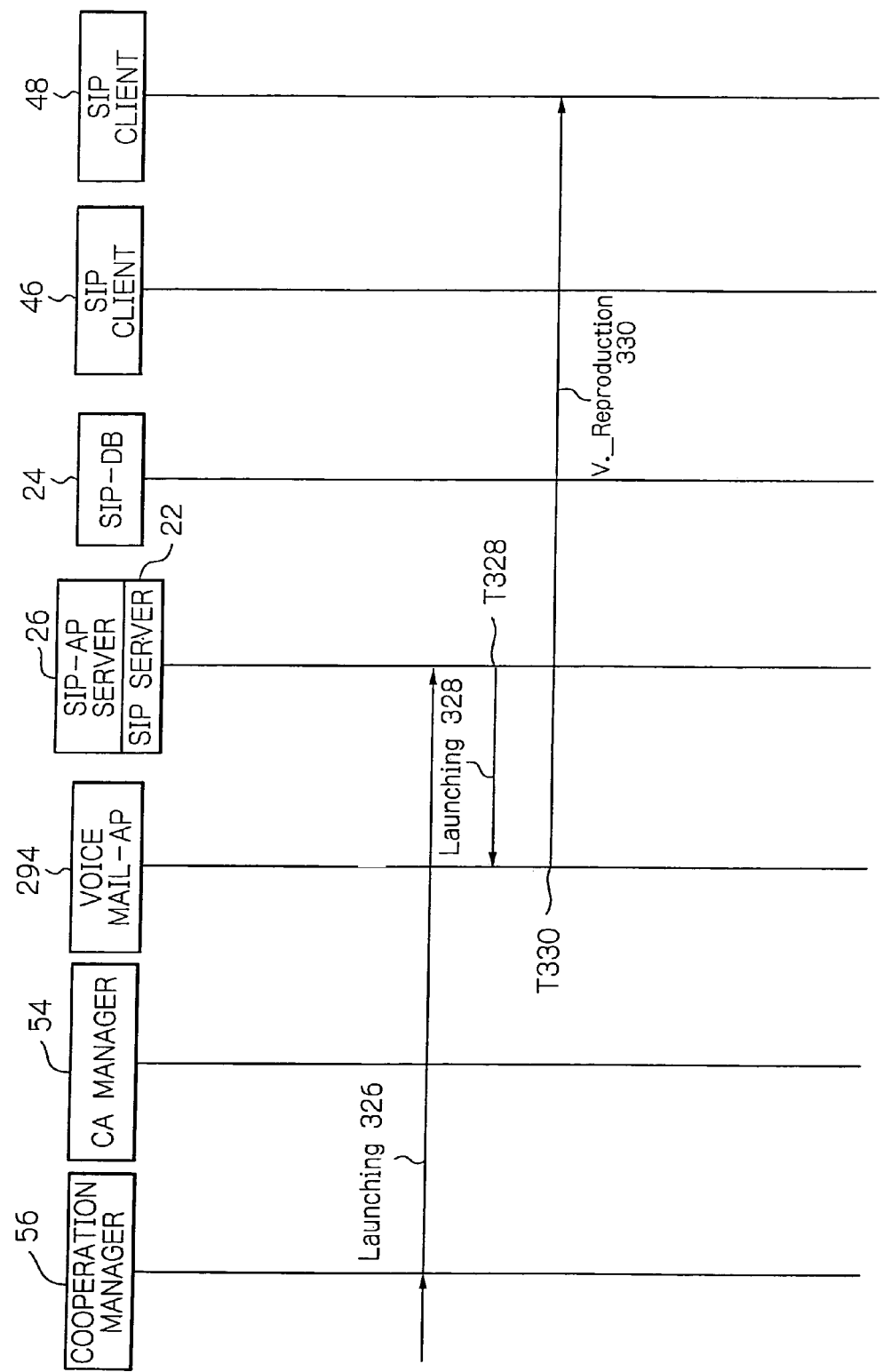

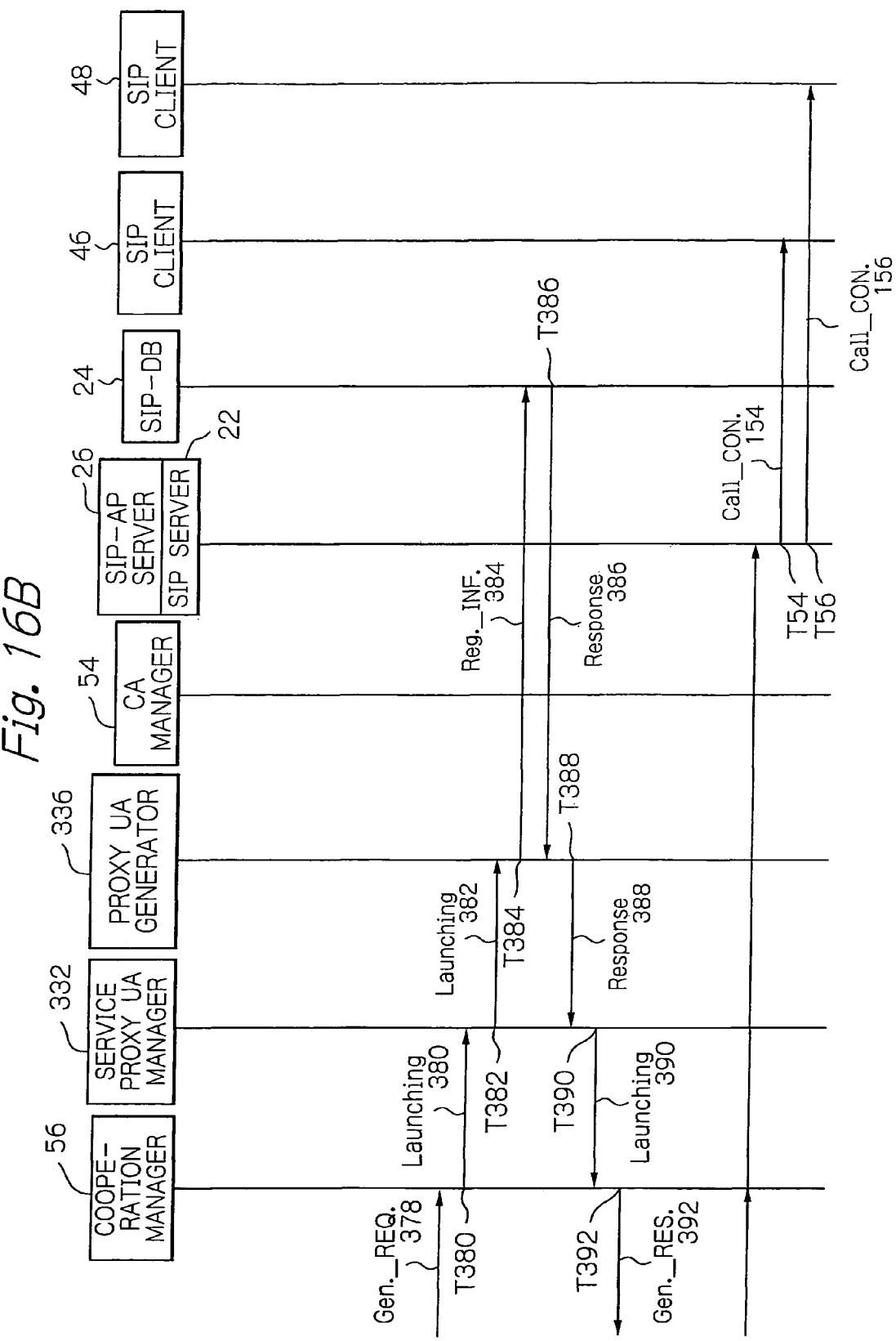

Fig. 17

| CA No. | TASK | REQUESTER | UA No. |
|---|---|---|---|
| CA 1 | CONFIRM SCHEDULE PROPOSED BY FIRM S | 46 | – |
| CA 2 | REQUEST FOR CHANGE OF DATE AND TIME FOR HEALTH CHECK | 46 | – |
| CA 3 | REQUEST FOR LIQUIDATION OF TRAFFIC CHARGES | 46 | – |
| ⋮ | ⋮ | ⋮ | ⋮ |

| CA No. | TASK | REQUESTER | UA No. |
|---|---|---|---|
| CA 1 | CONFIRM SCHEDULE PROPOSED BY FIRM S | 46 | UA 1 |
| CA 2 | REQUEST FOR CHANGE OF DATE AND TIME FOR HEALTH CHECK | 46 | UA 2 |
| CA 3 | REQUEST FOR LIQUIDATION OF TRAFFIC CHARGES | 46 | UA 3 |
| ⋮ | ⋮ | ⋮ | ⋮ |

Fig. 19

| CA No. | TASK | REQUESTER | UA No. | WATCHER (MONITORING ENTITY) | | |
|---|---|---|---|---|---|---|
| CA 1 | CONFIRM SCHEDULE PROPOSED BY FIRM S | 46 | UA 1 | 406: SIPURI | 409: SIPURI | |
| CA 2 | REQUEST FOR CHANGE OF DATE AND TIME FOR HEALTH CHECK | 46 | UA 2 | 406: SIPURI | 408: SIPURI | |
| CA 3 | REQUEST FOR LIQUIDATION OF TRAFFIC CHARGES | 46 | UA 3 | 407: SIPURI | | 408: SIPURI |
| ... | ... | ... | ... | | | |

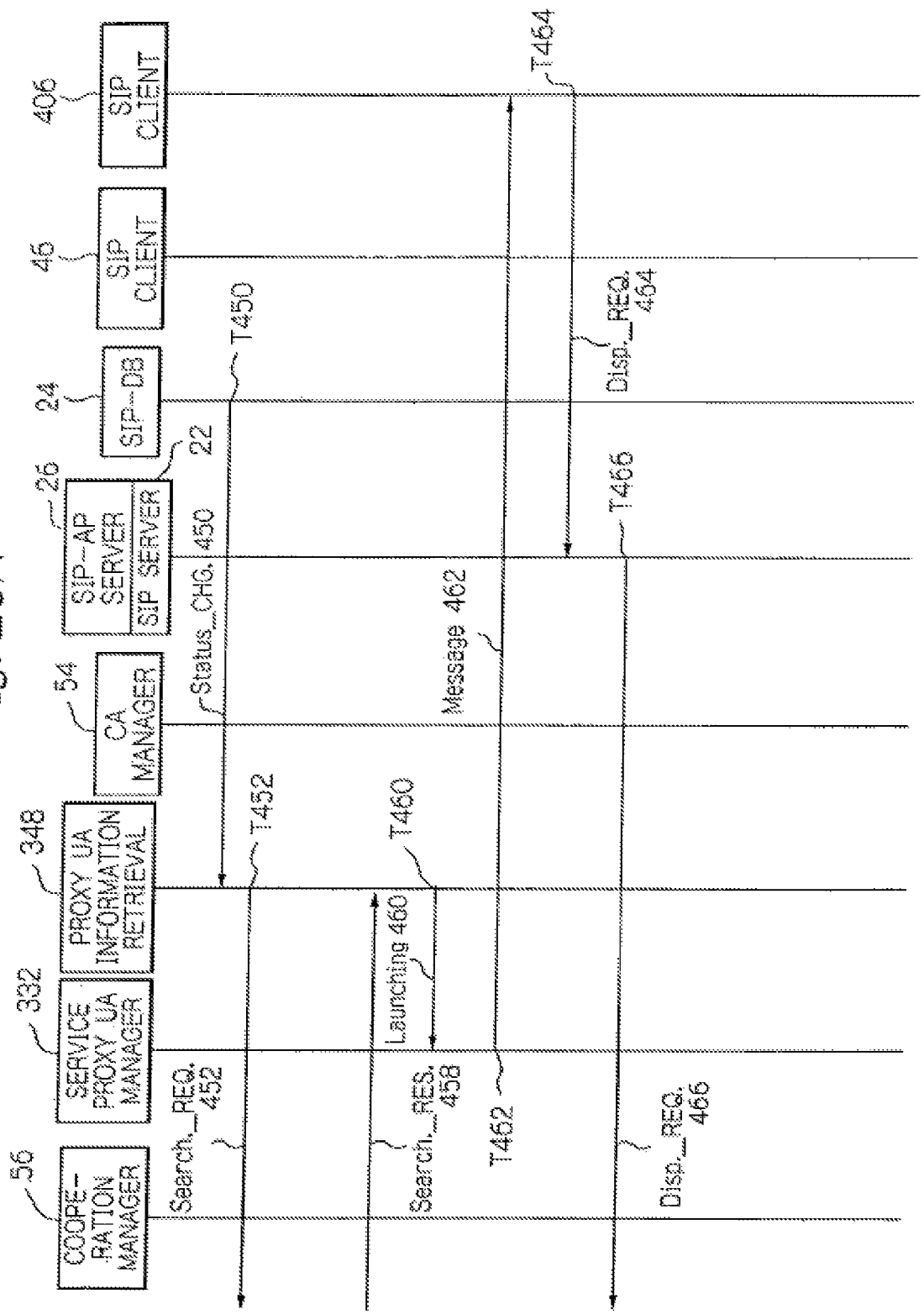

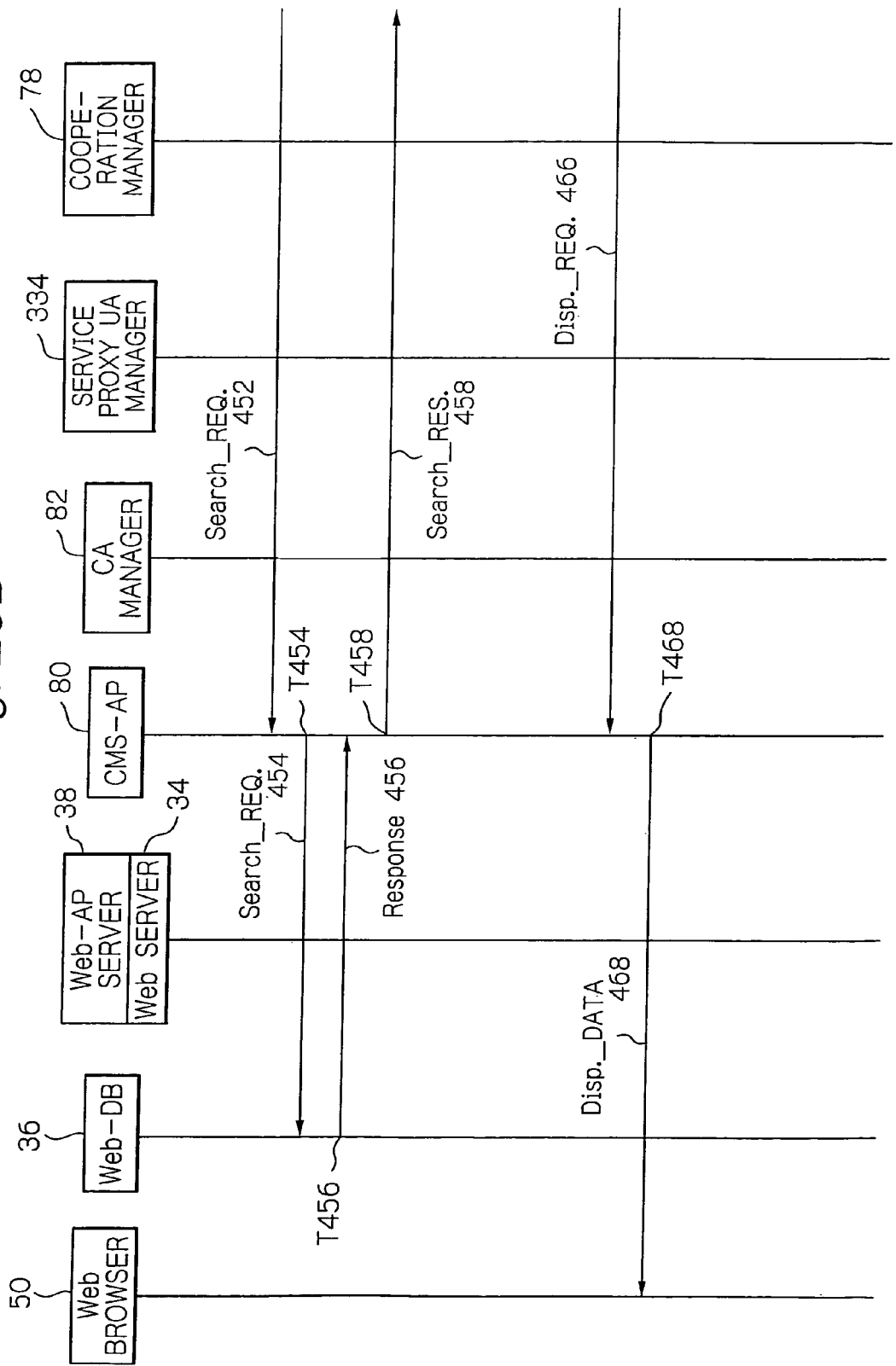

SERVICE PROVIDING SYSTEM COOPERATIVE WITH VOIP AND WEB ENVIRONMENTS AND A METHOD THEREFOR

BACKGROUND OF THE INVENTION

1. Field of the Invention

The present invention relates to a system for providing a service, and more particularly to a service providing system directed to a software model or system in which the VoIP (Voice over Internet protocol) server environment by the SIP (Session Initiation Protocol), a typical protocol implementing the VoIP, is cooperative with the Web-AP server environment providing an application, or application software, (AP) on the Web (World Wide Web) environment to provide a VoIP-Web cooperation type of application.

In addition, the present invention also relates to a method of providing a service, and more particularly to a method of providing a service for monitoring communication, as a specific service, which manages the log of VoIP communication, booted from the Web browser, in association with the state of accomplishment of the objective of communication, to support the execution of the communication and the accomplishment of the objective.

2. Description of the Background Art

Up to now in general, business organizations construct principal information systems, such as an enterprise resource planning (ERP) system, merely implementing individual, routinized tasks in the business organizations to manage the work flows and progressive schedules, as taught in Japanese Patent Laid-Open Publication No. 2003-141315. Among the routinized tasks in business organizations, there are basic tasks, such as accounting or inventory management, for improving the business efficiency. These systems were constructed as information-based systems, and existed in business organizations as systems separate from the telephone-based systems.

The aforementioned systems suffered from the problems that the business organizations had to construct large-scale systems from one task to another, and also that tasks and progressive schedules could not be managed for tasks difficult to routinize, such as a variety of minute business items or emergent tasks. In addition, with the conventional information-based systems, such as Web-based systems, it was possible for the managing personnel, in charge of respective operations, to simply confirm the progress of the operating states to confirm the state of the operations (such as completed or pending) at predetermined distant milestones, whereas it was not possible for the personnel to manage the detailed progressing states between the milestones.

Moreover, since the information-based systems were thus independent of the communication-based systems, there was also such a problem that information has not effectively been utilized between the information-based systems and the communication-based systems, such that, e.g. the call history of a communication-based system was not utilized in a information-based system, or the information obtained from an information-based system was not used in a communication-based system.

SUMMARY OF THE INVENTION

It is an object of the present invention to provide a system for and a method of providing a service in which an information-based system is made cooperative with a communication-based system to there by utilize information more efficaciously to manage tasks and the progressing states. thereof.

In accordance with the present invention, there is provided a service providing system for transmitting information between clients interconnected to systems constructed by environments with different communication protocols for providing the information as a service, in which the system comprises a first system operating based on a first protocol, and a second system operating based on a second communication protocol. The first system includes a first cooperative manager for processing first information to be sent out to the second system in accordance with a third communication protocol common to, and providing for cooperation between, the first communication protocol and the second communication protocol, the first cooperative manager processing second information received from the second system by the third communication protocol into third information by the first communication protocol, and a first call attempt manager for operating and managing information in a call attempt which is an instance of an object from call origination from one of clients interconnected to the first system to accomplishment of a call objective. The second system includes a second cooperative manager for processing the second information to be sent to the first system in accordance with the third communication protocol, and for processing the first information received from the first system into fourth information by the third communication protocol, a second call attempt manager for accessing from the second system an associated function of the first call attempt manager, and a monitor for monitoring a content and a situation of the communication in a client of the second system for providing the service.

The service providing system of the present invention envisages to provide cooperation between the first and second systems through first and second cooperative managers, boots the first call attempt manager, responsive to a request from the second call attempt manager, registers, e.g. a call attempt, sends out the registered result to the second system for display, enters and registers the task, and provides a connection or monitoring service between clients interconnected to the first system.

The present invention also provides a service providing method for transmitting information between clients interconnected to systems constructed by environments with different communication protocols for providing the information as a service. The service providing method comprises a first step of processing, in communication between a first system operating in accordance with a first communication protocol and a second system operating in accordance with a second communication protocol, first information to be sent out from the first system in accordance with a third communication protocol common to, and providing for cooperation between, the first communication protocol and the second communication protocol, a second step of processing the first information received by the second system into second information of the second communication protocol to output the second information, a third step of processing third information of the second communication protocol supplied to the second system into fourth information of the third communication protocol, and sending out the fourth information, a fourth step of processing the fourth information received by the first system into fifth information of the first communication protocol to output the fifth information, a fifth step of displaying the state of communication for a client interconnected to the second system, a sixth step of selecting a client of a task from tasks displayed in the second system, and entering a designation of the task for the client, a seventh step of requesting from the second system an access to a call attempt, which is an instance of an object from a call origination by one of clients interconnected to the first system to an accomplishment of an objective of the call, of the first system, sending the request in the third and fourth steps to the first system to generate the call attempt of the first system, and registering the call attempt generated, an eighth step of sending out a result attendant on a completion of the registration to the second system in the first and second steps, and displaying the result for the client interconnected to the second system, a ninth step for entering the task from the client for which the result has been displayed, a tenth step of registering the call attempt relevant to the input task in a correlated fashion, and an eleventh step of requesting communication to be set up between the clients interconnected to the first system, depending on the registered result, in the third and fourth steps.

The service providing method of the present invention envisages the cooperation between the first and second systems through the first and second steps and through the third and fourth steps, displays the situation of the communication, selects the requesting entity for the task and the designation of the task for the client, from the displayed situation, requests access to an associated call attempt of the first system from the second system, sends it out to the first system to generate a call attempt of the first system, registers the so generated call attempt, displays the result attendant on the completion of the registration in the second system, enters the task, registers the call attempt relevant to the input task, in a correlated fashion, and sets up communication to the client interconnected to the first system, to provide for efficient job processing.

The present invention also provides a service providing method for transmitting information between clients interconnected to systems constructed by environments with different communication protocols for providing the information as a service. The method comprises a first step of processing, in communication between a first system operating in accordance with a first communication protocol and a second system operating in accordance with a second communication protocol, first information to be sent out from the first system in accordance with a third communication protocol common to, and providing for cooperation between, the first communication protocol and the second communication protocol, a second step of processing the first information received by the second system into second information of the second communication protocol to output the second information, a third step of processing third information of the second communication protocol supplied to the second system into fourth information of the third communication protocol, and sending out the fourth information, a fourth step of processing the fourth information received by the first system into fifth information of the first communication protocol to output the fifth information, a fifth step of requesting a display of a list of a proxy user agent from a client interconnected to the first system, and conducting a retrieving responsive to the request, the proxy user agent being a function taking charge of virtually transmitting a request and a response to the client in the first system, a sixth step of supplying a retrieved result from the first system to the second system through the first and second steps, a seventh step of retrieving matching between the proxy user agent as the retrieved result and a task for which the call attempt is managed in the second system and a call attempt which is an instance of an object from a call origination from one of the clients interconnected to the first system to accomplishment of a call objective, sending out the retrieved result from the second system to the first system through the third and fourth steps, supplying the retrieved result to the client having output the request, and displaying the request, an eighth step of selecting a task to be monitored from information displayed in the client and registering the selected task, a ninth step of requesting registration of a watcher from the first system to the second system through the first and second steps, responsive to the registration, a tenth step of registering the watcher responsive to the request; and an eleventh step of supplying the registered result from the second system to the first system through the third and fourth steps to the client having selected the task to be monitored, and displaying the result supplied.

The service providing method of the present invention envisages the cooperation between the first and second systems through the first and second steps and through the third and fourth steps, receives and retrieves a request for display of a list of proxy user agents from the client of the first system, sends out the retrieved results to the second system, retrieves the matching between the task and the proxy user agent, sends out the retrieved result to the client having output the request in the first system, selects and registers the task to be monitored, again registers a watcher responsive to a request for registration, in the second system, sends out the registered result to the client having selected the task to be watched in the first system, and displays the result, whereby the operating state of the registered task may be comprehended in real time by the client in the first system through the proxy user agent.

BRIEF DESCRIPTION OF THE DRAWINGS

The objects and features of the present invention will become more apparent from consideration of the following detailed description taken in conjunction with the accompanying drawings in which:

FIGS. 1A and 1B are schematic block diagrams showing a preferred embodiment of a communication system employing the service providing system of the present invention;

FIGS. 3A and 3B show an operational sequence until a call setup, inclusive of the processing of the communication monitoring service application in the communication system shown in FIGS. 1A and 1B;

FIG. 4 shows an example of the call attempt management information managed by a SIP database shown in FIG. 1A;

FIG. 5 shows an example of a task-call attempt list managed by a Web database shown in FIG. 1B;

FIGS. 6A and 6B illustrate an operational sequence of status changes attendant on a call closure in the communication system shown in FIGS. 1A and 1B;

FIGS. 7A, 7B and 7C illustrate an operational sequence until the setup of a call of re-request by monitoring in the communication system shown in FIGS. 1A and 1B;

FIG. 8 illustrates an operational sequence of inputting a message and a task in the communication system shown in FIGS. 1A and 1B;

FIG. 9 illustrates the operational sequence attendant on unsealing a message in the communication system shown in FIGS. 1A and 1B;

FIG. 10 is a schematic block diagram showing the configuration of an alternative embodiment of a SIP system in a communication system employing a service providing system of the present invention;

FIGS. 11A and 11B illustrate an operational sequence of inputting and registering a voice message in the communication system employing the service providing system shown in FIG. 10;

FIGS. 12A and 12B show an operational sequence of reproducing a voice message carried out in conjunction with monitoring in the communication system shown in FIG. 10;

FIGS. 16A and 16B illustrate an operational sequence until a call setup by inputting a task in the communication system shown in FIGS. 14A and 14B;

FIG. 17 shows an example of a task-call attempt-proxy user agent list managed by the Web database shown in FIGS. 14A and 14B;

FIG. 19 shows an example of a task-call attempt-proxy user agent-watcher list managed by the Web database shown in FIGS. 14A and 14B; and FIGS. 20A and 20B illustrate an operational sequence of message transmission attendant on a status change in the communication system shown in FIGS. 14A and 14B.

DESCRIPTION OF THE PREFERRED EMBODIMENTS

Referring to the accompanying drawings, preferred embodiments of the service providing system will be described in detail according to the present invention. In an embodiment, now described, the service providing system of the present invention is applied to a communication system 10. The parts or components not directly relevant to understanding the present invention are not shown nor described.

Figure 1B:
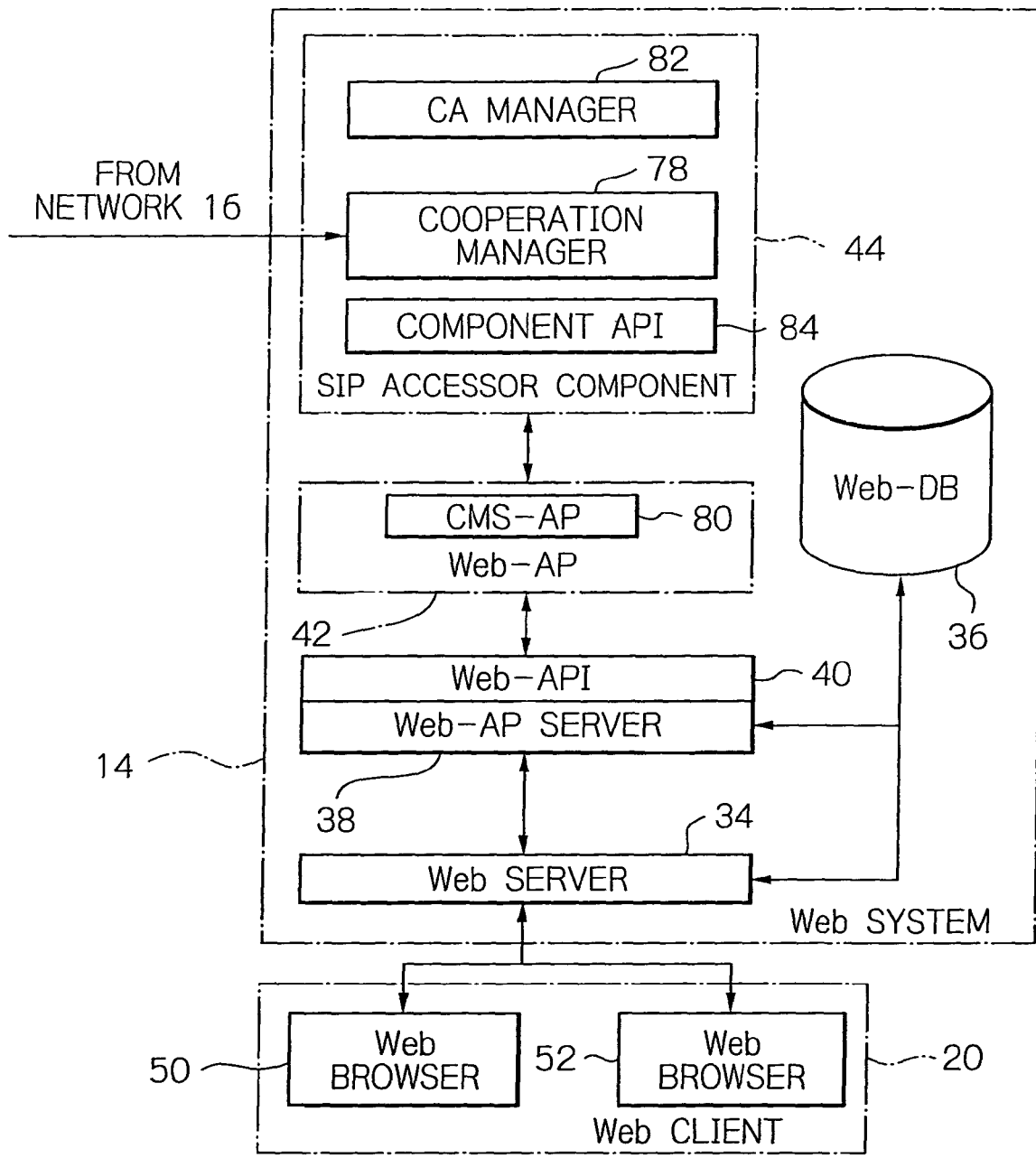

With reference now to FIGS. 1A AND 1B, the communication system 10 includes a SIP (Session Initiation Protocol) system 12, a Web system 14, a SOAP/CORBA network 16, a SIP client 18 and a Web client 20 interconnected as illustrated. In the communication system 10, the SIP system 12 and the Web system 14 are interconnected by the SOAP/CORBA (Simple Object Access Protocol/Common Object Request Broker Architecture) network 16 for conducting the communication. The SIP system 12 and the Web system 14 are arranged on network environments belonging to respective different network domains, and are provided with functional blocks complementing the Web and SIP environments not inherently owned by the SIP system 12 and the Web system 14, respectively. In this manner, the communication system 10 owns an environment in keeping with a system in which the SIP system 12 and the Web system 14 are arranged in a sole server computer or in a LAN environment in the same domain.

The SIP system 12 includes a SIP server 22, a SIP data base (SIP-DB) 24, a SIP application server (SIP-AP server) 26, a SIP application interface (SIP-API) 28, a SIP application (SIP-AP) 30 and a Web accessor component 32. The Web system 14 includes a Web server 34, a Web database (Web-DB) 36, a Web application server (Web-AP server) 38, a Web application interface (Web-API) 40, a Web application (Web-AP) 42 and a SIP accessor component 44. The SIP system 12 and the Web system 14 will be described in detail subsequently.

The SOAP/CORBA network 16 works under a communication protocol playing the role of mediating information between the SIP system 12 and the Web system 14 to interconnect both of the systems to each other. As part of the aforementioned communication protocol, the SOAP (Simple Object Access Protocol) is a communication protocol prescribing the data format and the processing rules for messages transmitted between Web services. When the SOAP protocol is used, the SOAP/CORBA network 16 permits a service requester, a service provider and a service broker to transmit and receive SOAP messages conforming to the rules. The CORBA architecture is a distributed object technique implemented by the Object Management Group (OMG).

The SIP client 18 is connected to the SIP server, and has a client environment of exploiting the functions provided by the SIP application 2630. It may, for example, be a SIP softphone. In the present embodiment, SIP client terminals 46 and 48 are used.

The Web client 20 is connected to the Web server 34, and has its client environment completed for exploiting the functions provided by the Web application 42. It may, for example, be a Web browser. In the present embodiment, Web browsers 50 and 52 are used. Of these, the Web browser 52 is for maintenance. In general, the Web browser exploits the GUI (Graphical User Interface) provided by the Web server 34 and demonstrated on the Web browser.

The components of the SIP system 12 and the Web system 14, described above, will now briefly be described. The SIP server 22 is a server making a response to a request from a client based on the SIP protocol, the protocol of the client-server model for end-to-end communication. In particular, the SIP server has the functions of handling and managing the SIP pursuant, e.g. to the RFC (Request For Comments) 3261 provided for by the International Engineering Task Force (IETF). As for the management functions, the SIP server 22 has, in general, three server functions, a SIP proxy server function, a SIP registrar server function and a SIP location server function. The SIP proxy server function is for relaying a SIP message as a proxy for a client. The SIP registrar server function functions as managing the client registration. The SIP location server function is of managing, e.g. the address information of the registered clients. The SIP server 22 is connected, e.g. to the SIP client terminals 46 and 48, the components of the SIP client 18, to transmit and receive information provided by the SIP-AP server 26 in the form of SIP messages.

The SIP database 24 is a storage device for holding information, such as user or presence information, managed by the SIP server 22. It is connected to the SIP server 22, and may own the function of providing information responsive to a retrieval request from the SIP server 22. It is noted that, in the SIP database 24, the SIP database 24 stores user information as the address. Presence information is character of indicating whether or not a client is connected to the SIP system 12, whether or not a client has been booted and used, or whether or not a client is being connected to another client.

The SIP-AP server 26 is a server responsive to an operation for running an application program, managed by the SIP server 22, based on the SIP protocol. The SIP-AP server 26 is connected to the SIP server 22 and to the SIP-AP interface 28. The SIP-AP interface 28 has the functions of transmitting a SIP request received by the SIP server 22 to the application, and of issuing a request to the SIP server 22. The SIP request may be exemplified by a session setup, an acknowledgement, the termination of a call and a presence change.

The SIP-AP interface 28 is an application interface provided by the SIP-AP server 26. The SIP-AP server 26 is connected to the SIP application 30 via the SIP-AP interface 28. The SIP-AP interface 28 may be exemplified by a SIP Servlet application interface standardized by the Java (trademark) Community Process (JCP).

The SIP application 30 is an application constructed by the SIP-AP interface 28 connected thereto and running on the SIP-AP server 26. The SIP application 30 may be exemplified by an IP telephone, an instant message, a TV (TeleVision) telephone and presence communication.

The Web accessor component 32 generically includes a set of components with which the SIP application 30 cooperates with the Web application 42, each of those components being a library software component part. Hence, the Web accessor component 32 is invoked when the SIP application 30 comes into play, and is used for communication with the SIP accessor component 44 of the Web system 14, as later described. The Web accessor component 32 includes, e.g. a call attempt (CA) manager 54, a cooperation manager 56 and a component application interface (component API) 58.

Now, the instance of an object, having its life time from originating a call from a calling party for intending to make a contact to accomplishing the objective of the call, is termed a call attempt (CA). The CA manager 54 has the functions of managing the status during the life time, and of managing the operation in conjunction with information exemplified by calling party information, called party information and information on a call attempt history. It is noted that the status stands for numerical representation of information indicating the situation of an objective being accomplished. Examples of the status include completion, awaiting a response, awaiting a message and a re-request schedule. The call attempt information is a generic term for the call attempt sender information, called party information and the call attempt history information.

Figure 2A:
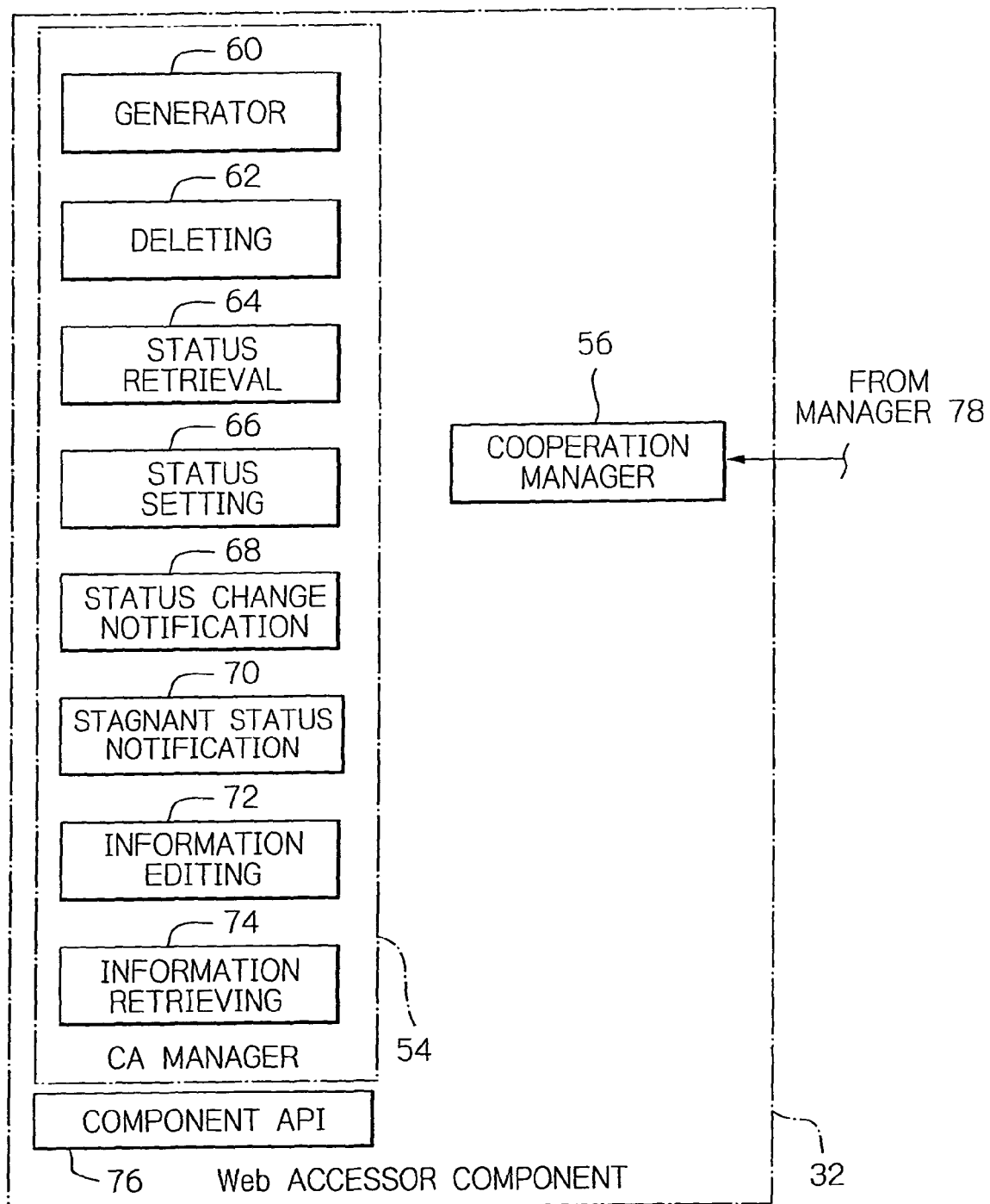
FIGS. 2A and 2B are schematic block diagrams respectively showing the configurations of Web and SIP accessor components included in the communication system shown in FIGS. 1A and 1B.

The CA manager 54 includes a generating subsection 60, a deleting subsection 62, a status retrieval subsection 64, a status setting subsection 66, a status change notification subsection 68, a stagnant status notification subsection 70, an information editing subsection 72 and an information retrieving subsection 74 as shown in FIG. 2A. The generating subsection 60 and the deleting subsection 62 have the functions of generating and deleting a call attempt corresponding to the call origination instance of a calling party, respectively. The status retrieval subsection 64 and the status setting subsection 66 have the functions of retrieving and setting the communication status information of a call attempt corresponding to a call origination instance, respectively.

The status change notification subsection 68 has the function of being responsive to a status change caused by operation by a calling or called party for notifying the change to the progress of the status, such as call or acknowledgement. The stagnant state notification subsection 70 has the function of notifying that, when a notification was made for dealing with a change and yet a status change was not made within a predetermined period of time, the change has not been dealt with. By this notification, the stagnant state notification subsection 70 instigates and prompts the calling or called party to change the status. The information editing subsection 72 and the information retrieving subsection 74 have the functions of editing and retrieving, respectively, information on a calling party, a called party and a call attempt history of a call attempt corresponding to a call origination instance.

A component AP interface 76 is included in the component AP interface 58 for the SIP application 30 to use the service proxy CA manager 54.

The Web accessor component 32 may be used in combination, from the SIP application 30 side, depending on which function is to be implemented as the specified SIP application 30. The Web accessor component 32 may be extended from time to time, depending on an intended use, for adding components other than that described above. The addition and extension of components will cause variations to be added or expanded in the cooperation with the Web system 14.

The cooperative manager 56 has the function of cooperating with a cooperation manager 78 in the Web system 14 to manage the communication environment for accessing the service proxy UA manager 332 and the CA manager 54 from the Web system 14 side or to the Web system 14 side. The cooperative management environment may be exemplified by environmental setting matched to, for example, the SOAP or CORBA protocol. The cooperative manager 56 has the function of conforming information to a common communication protocol and to the SIP protocol.

Referring to FIG. 1B, the Web system 14 will be described. The Web server 34 is of handling and managing based on the HTTP protocol. The Web server 34 is connected to Web browsers 50 and 52, the components of the Web client 20. The Web server 34 is connected to and manages a Web database (DB) 36 and a Web-AP server 38.

The Web database 36 is a storage device for storing information managed by the Web server 34, and may own the function of providing the information responsive to a retrieval request of the Web server 34. The managed information may be exemplified by toll information and a use log for a client.

The Web-AP server 38 is in its booted state all times, and is responsive to an operation to run an application managed by the Web server 34 based on the HTTP protocol, a Web protocol. The Web-AP server 38 may be exemplified by an open-source TOMCAT and WebLogic (trademark) by BEA System, Inc. The Web-AP server 38 is connected by a Web-AP interface 40 to a Web application 42. The Web-AP server 38 may run an application based on information from the Web database 36.

The Web-AP interface 40 is an application interface provided by the Web-AP server 38. Representative of the Web-AP interface 40 may be HTTP Servlet AP interface and EJB (Enterprise Java (trademark) Beans), as prescribed by J2EE (Java2 Enterprise Edition) environment. The Web-AP interface 40 enables information to be transmitted between the Web-AP server 38 and the Web application 42.

The Web application 42 is constructed by the Web-AP interface 40 connected thereto. The Web application is run on the Web-AP server 38, and also is connected to the SIP accessor component 44. For example, the Web application 42 includes an application, such as an Internet shopping mall and a portal service or contents distribution of a business organization. In the present embodiment, the Web application includes a communication monitoring service application (CMS-AP) 80. The CMS application 80 is for presenting information, in a viewable form, demonstrating, e.g. processing contents, an entity under contact and a status representation for processing in plural communication services.

The SIP accessor component 44 includes a set of components for the Web application 42 to cooperate with the SIP system 12, and is the library software invoked when the Web application 42 is in operation. The SIP accessor component 44 is used when the Web application 42 communicates with the Web accessor component 32 on the SIP system 12. Similarly to the Web accessor component 32, the Web application 42 may be used in combination, in this case, from the Web application 42 side, depending on which function may be performed in cooperation with the SIP-AP server 26. The SIP accessor component 44 may be extended in an intended manner, depending on an intended use. The addition and extension of components will cause variations to be added or expanded in the cooperation with the SIP system 12.

Figure 2B:
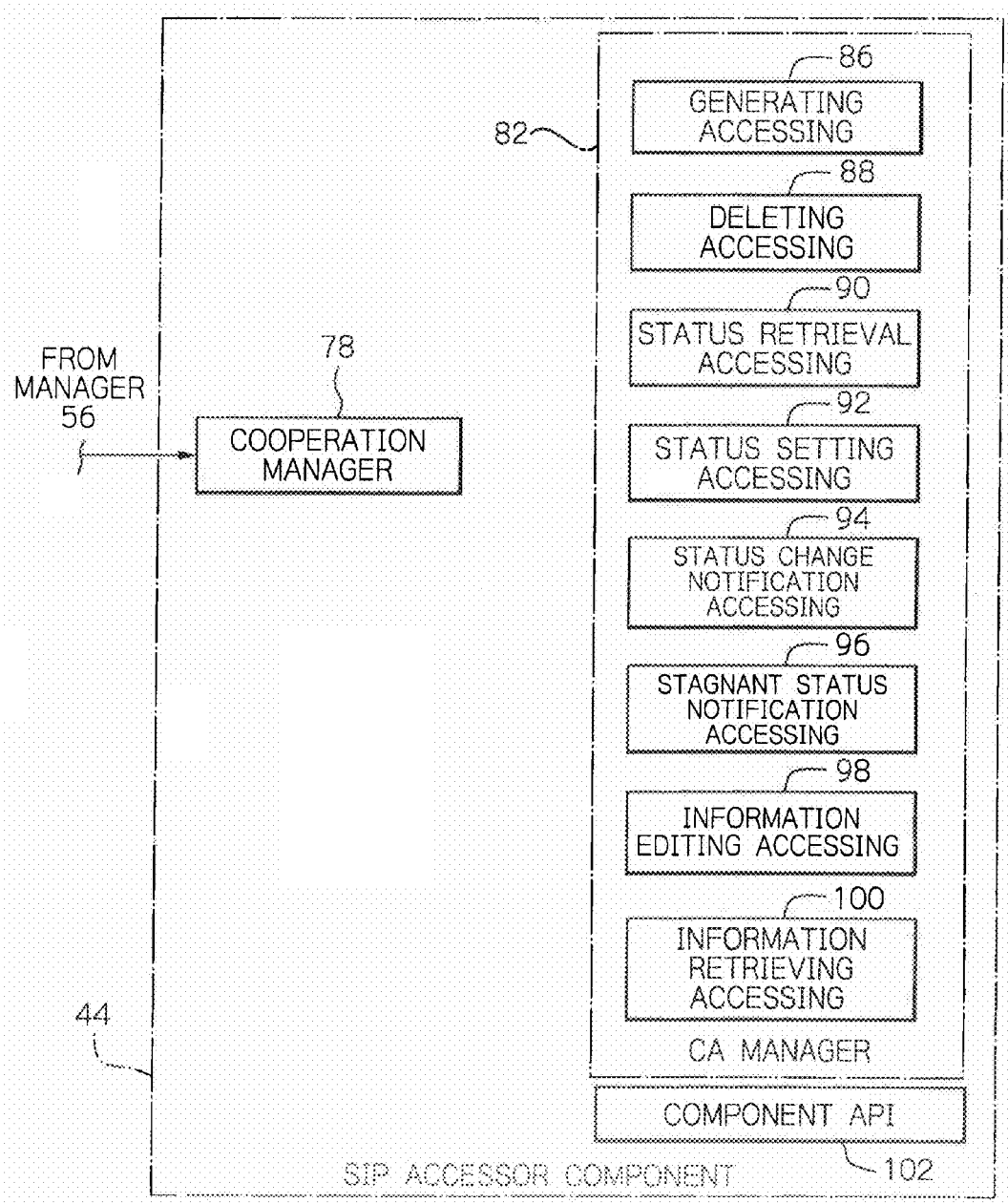

The SIP accessor component 44 includes a call attempt (CA) manager 82, a cooperation manager 78 and a component AP interface 84. The CA manager 82 is a component in the Web system 14 for accessing call attempt information managed within the SIP system 12. Referring to FIG. 2B, the CA manager 82 includes a generating accessing subsection 86, a deleting accessing subsection 88, a status retrieval accessing subsection 90, a status setting accessing subsection 92, a status change notification accessing subsection 94, a stagnant status notification accessing subsection 96, an information editing accessing subsection 98 and an information retrieving accessing subsection 100.

The generating accessing subsection 86 and the deleting accessing subsection 88 are modules having the functions of accessing the generating subsection 60 and the deleting subsection 62 of the CA manager 54 in the SIP system 12 from the Web system 14. The status retrieval accessing subsection 90 and the status setting accessing subsection 92 are modules having the functions of accessing the status retrieval subsection 64 and the status setting subsection 66 of the CA manager 54 in the SIP system 12 from the Web system 14.

The status change notification accessing subsection 94 and the stagnant status notification accessing subsection 96 are modules having the functions of accessing the status change notification subsection 68 and the stagnant status notification subsection 70 of the CA manager 54 in the SIP system 12 from the Web system 14. The information editing accessing subsection 98 and the information retrieving accessing subsection 100 are modules having the functions of accessing the information editing subsection 72 and the information retrieving subsection 74 of the CA manager 54 in the SIP system 12 from the Web system 14, respectively.

The cooperation manager 78 has the function of cooperating with the associated cooperation manager 56 in the SIP system 12, and exploiting the CA manager 54 to access the SIP system 12 or have the Web system 14 accessed. For this function, the communication environment is set, conforming to the cooperative management of the SIP system 12. For this communication environment, used is the cooperative communication environment, such as SOAP or CORBA. The cooperation manager 78 has the function of converting the information into information of the common communication protocol and into information of the HTTP protocol.

The component AP interface 84 is arranged so as to be used by the Web application 42. A component AP interface 102 is provided in keeping with the CA manager 82, as shown in FIG. 1B.

Thus, by the cooperation between the applications provided in the SIP system 12 and in the Web system 14, it is possible to provide for cooperation between the SIP system 12 and the Web system 14 to furnish the services of the application to a user on real-time communication.

With the embodiment the communication system 10, description will be made on an operational sequence of the CMS application 80, exploiting the CA manager 82. In operation, described will now be a call setup associated with inputting a task, a status change attendant on a call disconnection, a call setup for re-request by monitoring, an input of a task and a message, and unsealing a message by way of monitoring. In the following description, signals are designated by the reference numerals of connections on which they appear.

When a call is set up in association with a task input, as shown in FIG. 3A, the Web browser 50 at a timing T10 places a request (Disp._REQ) 110 asking one of the Web server 34 and the Web-AP server 38 for displaying a task input frame for the CMS application 80. For simplicity, the selected one server will be referred below to as Web server 34/Web-AP server 38. The Web server 34/Web-AP server 38 at a timing T12 transmits a request for displaying the task input frame (Disp._REQ) 112 to the CMS application 80 at a timing T14. The CMS application 80 transmits data of the task input frame (Disp._DATA) 114, consistent with the request, to the Web server 34/Web-AP server 38. The Web server 34/Web-AP server 38 at a timing T16 sends out data of the task input frame 116 to the Web browser 50, which in turn places the request for display on its viewing screen. On the task input viewing screen of the Web browser 50, there are provided a task input field, intended to be monitored, a destination entry field and a display button for displaying a contact list.

The Web browser 50 at a timing T18 issues to the Web server 34/Web-AP server 38 a list request (List._REQ) 118 for "contact list display" for candidates for transmission for a new task. The Web server 34/Web-AP server 38 at a timing T20 is responsive to this request to send out contact list data (List_DATA) 120 to the Web browser 50. In the contact list data 120, there is contained the information exemplified by an indication or designation, such as the name, the telephone number or the presence, of a destination or called party under communication. The user selects an intended one of contact destinations from the contact list displayed on the Web browser 50. The Web browser 50 at a timing T22 outputs a connection request ("contact list selection") of the destination of contact selected to the CMS application 80 as selected information (SEL._INF.) 122 to the CMS application 80. This initiates the communication.

The CMS application 80 generates a boot signal (Launching) 124 for the CA manager 82, based on the "contact list selection". Of course, the selection information 122 is included in the boot signal 124. The CMS application 80 at a timing T24 sends out the so generated boot signal 124 to the CA manager 82. The CA manager 82 exploits the component AP interface 102 in response to the boot signal 124, supplied thereto, to boot the generating accessing subsection 86. The generating accessing subsection 86 generates a boot signal 126 used for booting the cooperative manager 78. The generating accessing subsection 86 at a timing T26 sends out the so generated boot signal 126 to the cooperation manager 78.

The cooperation manager 78 exploits one of the SOAP and CORBA protocols to communicate with the cooperation manager 56 present in a separate domain on the SOAP/CORBA network 16, in order to transmit the selection information 122 to the cooperation manager 56. The cooperation manager 78 at a timing T28 sends out a "request for call attempt generation" (CA_Gen._REQ.) 128, inclusive of the selection information 122, to the cooperation manager 56. The cooperation manager 56 receives the "request for call attempt generation" 128.

Referring to FIG. 3b, the cooperation manager 56 generates a boot signal 130 for the generating subsection 60 of the cooperation manager 56. The cooperation manager 56 at a timing T30 sends out the so generated boot signal to the CA manager 54. The CA manager 54 is responsive to the boot signal 130 to boot the generating subsection 60. The generating subsection 60 generates an instance of the call attempt, associated with the task, in the SIP database 24, and registers the so generated instance at a timing T32 (Registration 132).

For example, the instance-management information of a call attempt (CA) may be exemplified by the call attempt number (CA No.), a requester, a receiver, a start time, an end time, communication means and a status.

Returning to FIG. 3B, the SIP database 24 at a timing T34 outputs to the generating subsection 60 a response signal (Response) 134, indicating the end of the call attempt generation attendant on completion of the registration. The generating subsection 60 receives the response signal 134 to generate a boot signal 136 for the cooperation manager 56. The generating subsection 60 at a timing T36 outputs the so generated boot signal 136 to the cooperation manager 56.

The cooperation-manager 56 at a timing T38 exploits one of the SOAP and CORBA protocols, in order to notify the CA manager 82, FIG. 3A, of the result of transmission made from the CA manager 82, to feed at a timing T38 the cooperation manager 78 with the result (CA_Gen._RES) 138 of a "request for call attempt generation" issued by the CA manager 82. The cooperation manager 78 at a timing T40 transmits a response signal 140 indicative of the result from the "request for call attempt generation" to the generating accessing subsection 86. The CA manager 82 receives the response signal 140 and, at a timing T42, transmits a response signal 142 to the CMS application 80, representing the executed result of the component AP interface 102. The CMS application 80 processes the result to a form capable of indicating that the relevant contact destination has been selected. The display form is preferably an inverted display of the data. The CMS application 80 outputs the display data (Disp._SEL.) 144, processed at a timing T44, to the Web browser 50. The Web browser 50 displays the data with an appropriate contact destination on the contact list inverted in intensity on its viewing screen.

After having set up the task and the contact destination, the communication system 10 proceeds to setting up a call. The browser 50 at a timing T46 issues a task-call attempt registration request (CA_Reg._REQ) 146 to the CMS application 80. The CMS application 80 at a timing T48 accepts the task-call attempt registration request 146 to register the task and the call attempt information on a task-call attempt registration list of the Web database 36 (Reg.148). In the task-call attempt registration list, there are involved the call attempt number (CA. No.), the task and the requester, as shown in FIG. 5. The Web database 36 at a timing T50 issues a registration end notification (Reg._Notify) 150 to the CMS application 80.

The CMS application 80 at a timing T52 communicates with one of the SIP-AP server 26 and the SIP server 22 over the SOAP/CORBA network 16. The one server communicated with will be referred to below as the SIP-AP server 26/SIP server 22. The brokering operation by the SOAP/CORBA network 16 is performed by a communication protocol selected by the cooperation managers 78 and 56. The SIP-AP server 26/SIP server 22, FIG. 3B, is requested at a timing T52 to "set up a call" between the SIP client 46, a contact destination, and the SIP client 48, a user (Call_REQ.152).

The SIP-AP server 26/SIP server 22 exploits the sequence of, e.g. 3PCC (3rd Party Call Control), and at a timing T54 transmits a call control signal (Call_CON.) 154 to the SIP client 46 as the selected contact destination. In a similar manner, the SIP-AP server 26/SIP server 22 at a timing T56 transmits a call control signal (Call_CON.) 156 to the SIP client 48 as the user. As a result, a call is set up between the SIP clients 46 and 48.

In the present embodiment, the task-call attempt registration list 148 is registered in the Web database 36. This is merely illustrative and the registration list may, of course, be registered in the SIP database 24.

The status changing by a call disconnection will now be described. Specifically, the operating sequence will be described with reference to FIGS. 6A and 6B from communicating in continuation from the call setup, responding to the termination of the communication to display a status input frame on the Web browser 50, in putting to which status the task targeted has been changed by the communication, and changing the status of the call attempt as a consequence thereof.

Figure 6A:
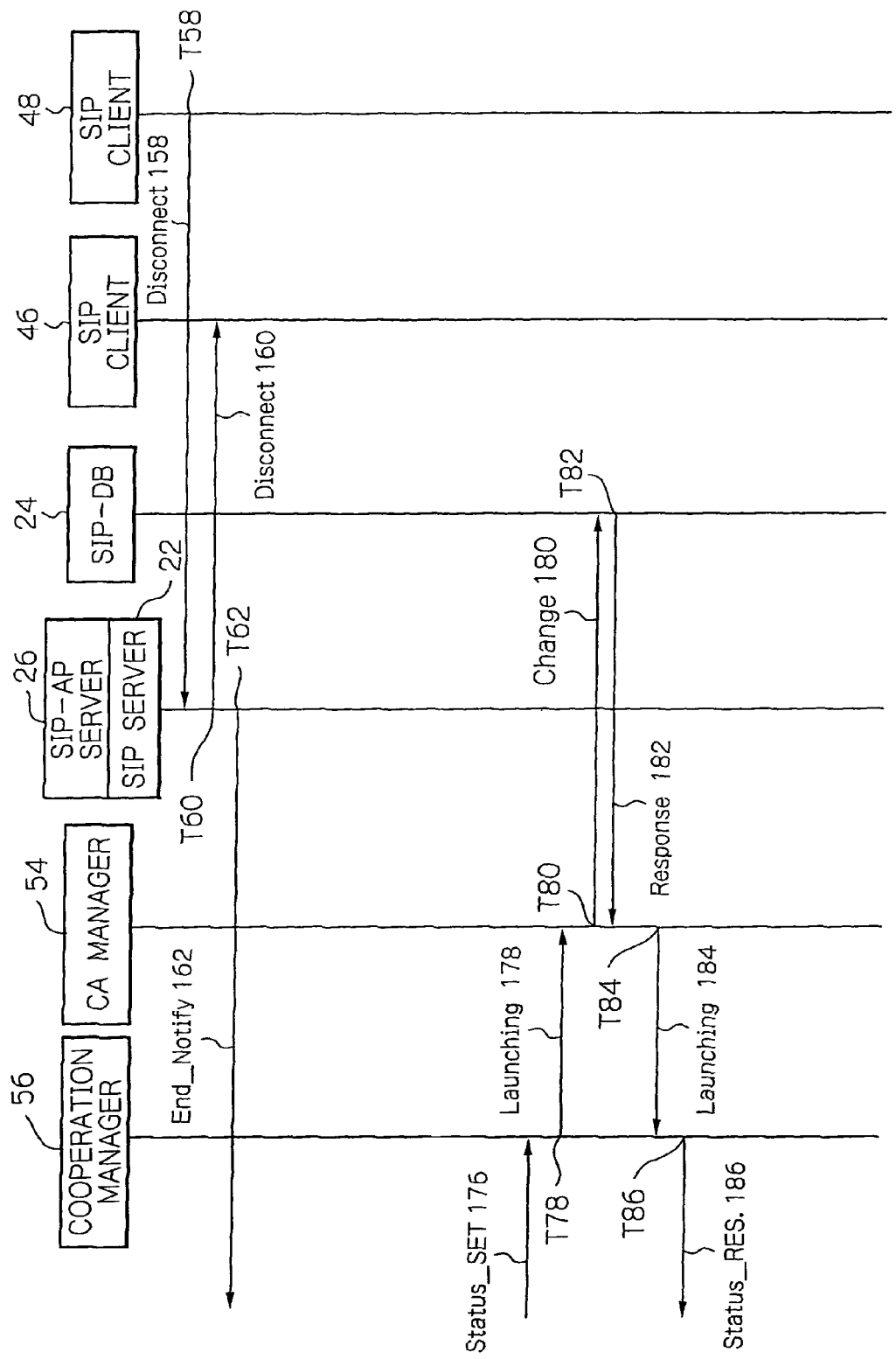

Referring to FIG. 6A, a disconnecting operation is made on the SIP client 48 at a timing T56 in the course of communication. Upon this operation, "call disconnection (Disconnect)" 158 is transmitted to the SIP-AP server 26/SIP server 22. The SIP-AP server 26/SIP server 22 at a timing T60 notifies to the SIP client 46, a counterpart entity of the communication, that the call shall be disconnected (Disconnect 160) to terminate the communication.

The SIP-AP server 26/SIP server 22 at approximately the same timing T62 notifies a signal (End Notify 162) to the CMS application 80, through the cooperation managers 56 and 78 and through the Web server 34/Web-AP server 38 of the termination ("call end") of the call set up between the SIP client 46, the selected contact destination, and the SIP client 48, the user. Although the statement of the notification is succinct, the cooperation managers 56 and 78 carry out, also in this notification, conversion for conforming to the common communication protocol in the SOAP/CORBA network 16 to send out the information (call end notice) between the two different systems, that is, from the SIP system 12 as one system to the Web system 14 as the other system.

From the task-call attempt list of the Web database 36, the CMS application 80 at a timing T64 retrieves the relevant task of the call, and display the contents for the Web browser 50 (Search 164). The Web database 36 at a timing T66 transmits display contents for the Web browser 50 to the CMS application 80 as a retrieved result (Result) 166. The CMS application 80 at a timing T68 outputs the task of the communication to the Web browser 50, processed to reflect a retrieved result 166, and display data (Disp._DATA) 168 representative of the status selection button of communication, to the Web browser 50. The Web browser 50 displays an image which has reflected the display data 168 supplied thereto.

To the Web browser 50, an input is made by the user operation as to which status the targeted task has been changed by the immediately previous communication. The input contents are sent out at a timing T70 through the Web server 34/Web-AP server 38 to the CMS application 80. The input contents may be enumerated by a completion, a re-request, a replay waiting and a message waiting. The CMS application 80 generates a boot signal 172 for the CA manager 82 based on the "status contents (Status)" 170. The boot signal 172 includes a status 170. The CMS application 80 outputs the so generated boot signal 172 to the CA manager 82. The CA manager 82 exploits the component AP interface 102, based on the boot signal 172, supplied thereto, to boot the status setting accessing subsection 92. The status setting accessing subsection 92 at a timing T74 outputs the boot signal 174 for the cooperation manager 78. The cooperation manager 78 is booted responsive to the boot signal 174 supplied thereto.

For transmitting the status information (Status_SET) at a timing T76 to the CA manager 54, the cooperation manager 78 exploits one of the SOAP and CORBA protocols to convert the information to information by the common communication protocol, in order to have communication with the cooperation manager 56, FIG. 6A, existing on a separate domain on the SOAP/CORBA network 16. The information of interest here is status information. The cooperation manager 56 communicates with the cooperation manager 78 to receive the "status contents" 176 issued with the status inputting.

The cooperation manager 56 generates a boot signal 178 for the status setting subsection 66 in the CA manager 54. The cooperation manager 56 at a timing T78 sends out the boot signal 178 to the status setting subsection 66. The status setting subsection 66 is booted responsive to the boot signal 178 supplied thereto. The status setting subsection 66 at a timing T80 updates or changes an appropriate value in the SIP database 24 with the status value of the call attempt matched to the task to register the so updated or changed value (Change 180). The SIP database 24 at a timing T82 outputs a response signal 182, indicating the completion of the status setting updated, to the status setting subsection 66 of the CA manager 54. The status setting subsection 66 receives the response signal 182 to generate a boot signal 184 for the cooperation manager 56. The status setting subsection 66 at a timing T84 outputs a boot signal 184 to the cooperation manager 56. The cooperation manager 56 is booted responsive to the boot signal 184, and exploits one of the SOAP and the CORBA protocols, for returning the status setting result to the CA manager 82 as a response, to send out at timing T86 a status response (Status_RES.) 186 to the cooperation manager 78. The cooperation manager 78, FIG. 6B, at a timing T88 forwards the cooperation manager 82 with the setting result (Response) 188 of "status contents", carried out with a change in the status setting, obtained by the communication with the cooperation manager 56.

The CA manager 82 at a timing T90 returns the setting result 190 to the CMS application 80 as an executed result of the component AP interface 102. The CMS application 80 processes the setting result 190 to a form compatible with displaying that the status specified by the user has been set. This processing is preferably to a display of a message confirming the setting. The CMS application 80 at a timing T92 sends out the processed display data (Disp._DATA) 192 to the Web browser 50. The Web browser 50 demonstrates the display data on its viewing screen. The status setting change attendant on the task may be visualized on the Web browser 50.

Figure 7A:
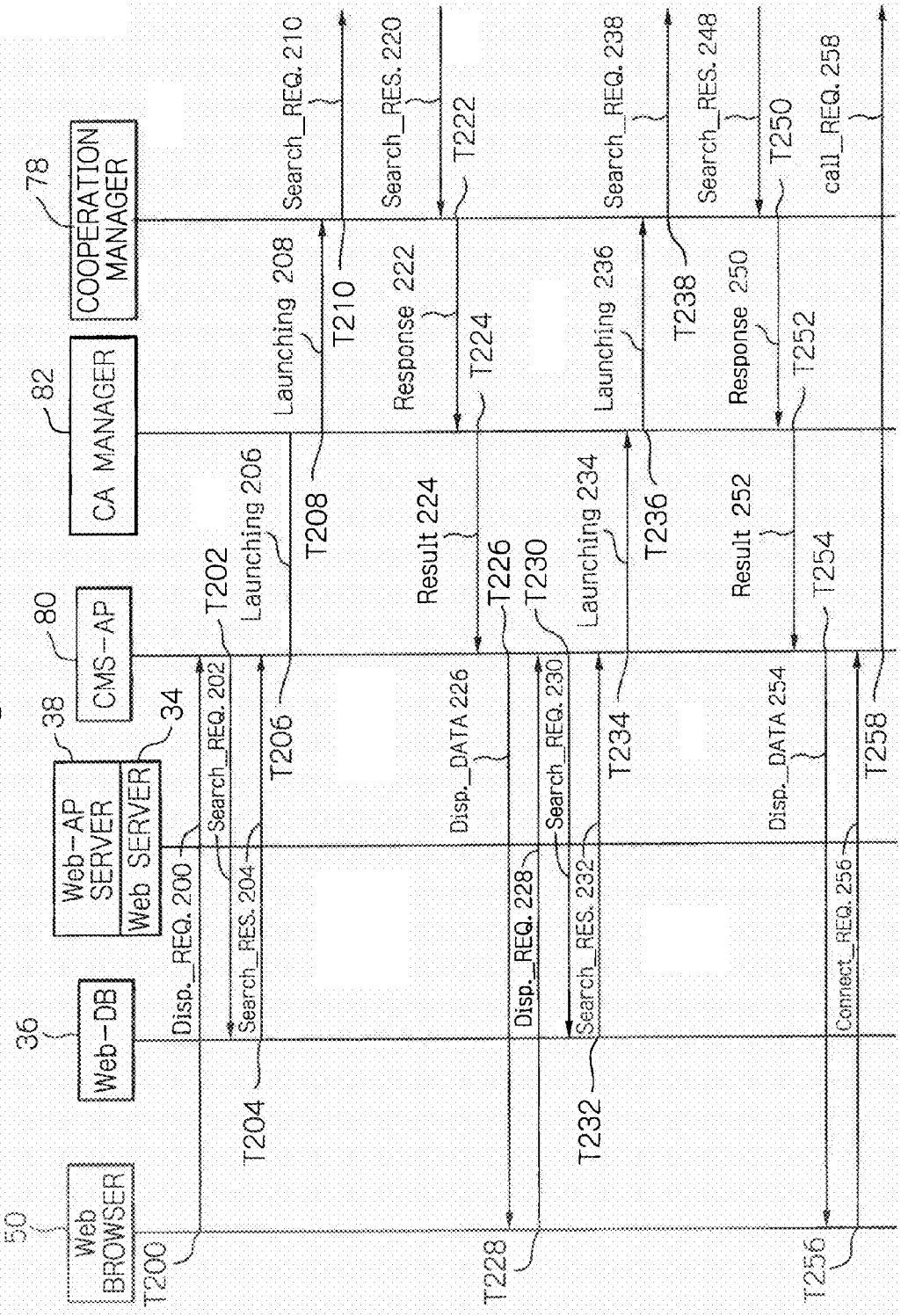

The operational sequence for a call set up by monitoring will now be described. Referring to FIG. 7A, the Web browser 50 at a timing T200 requests display data of a monitor screen or image from the CMS application 80 through the Web server 34/Web-AP server 38 (Disp._REQ.200). The CMS application 80 at a timing T202 requests the Web database 36 to retrieve a call attempt and a task involving the entity which requested the display of the monitor screen (Search_REQ.202). The Web database 36 retrieves the call attempt and the task involving the entity which requested the display of the monitor screen, and sends out the retrieved result (Search_REQ.) 204 at a timing T204 to the CMS application 80. Based on the retrieved result 204 of the call attempt and the task of the requesting entity, the CMS application 80 uses the component AP interface 102 within the CA manager 82 to generate aboot signal 206 for the information retrieving accessing subsection 100. The CMS application 80 at a timing T206 sends out the booting signal 206, generated at the timing T206, to the information retrieving accessing subsection 100. It is noted that one or more tasks may be requested by the requester.

The information retrieving accessing subsection 100 is booted responsive to the booting signal 206, supplied thereto, in order to generate a booting signal 208 for the cooperation manager 78. The information retrieving accessing subsection 100 outputs the booting signal 208, generated at the timing T208, to the cooperation manager 78. The cooperation manager 78 is booted responsive to the booting signal 208 supplied thereto. The cooperation manager 78 exploits one of the SOAP and CORBA protocols as a communication protocol, and communicates with the cooperation manager 56, existing in a distinct domain on the SOAP/CORBA network 16, in order to send out the retrieval information pertinent to the client-specific task to the cooperation manager 56 54. This cooperation manager 78 at a timing T210 outputs the "call attempt retrieval request" (Search_REQ.) 210, included in the booting signal 206, issued by the CMS application 80, to the cooperation manager 56.

The cooperation manager 56, FIG. 7B, receives the "call attempt retrieval request" 210 from the cooperation manager 78 to generate a boot signal 212 for the information retrieving subsection 74 in the CA manager 54. The cooperation manager 56 at a timing T212 outputs the so generated boot signal 212 to the information retrieving subsection 74. The information retrieving subsection 74 is booted, responsive to the boot signal 212 supplied and, at a timing T214, retrieves the statuses from the SIP database 24 (Search 214). This status retrieval may be made for plural tasks. The SIP database 24 at a timing 216 outputs a call attempt retrieval end (Response) T216. The information retrieving subsection 74 generates a boot signal 218 for the cooperation manager 56 and, at a timing T218, outputs a boot signal 218 to the cooperation manager 56.

For returning the retrieved result 216 from the SIP database 24 to the CA manager 82, FIG. 7A, as a response, the cooperation manager 56 exploits one of the SOAP and CORBA protocols to communicate with the cooperation manager 78. The cooperation manager 56 converts the communication protocol of the retrieved result 216 into the selected communication protocol and, at a timing T220, sends out the result of "request for call attempt retrieval" (Search_RES.) 220, issued by the status retrieval, to the cooperation manager 78.

The cooperation manager 78 at a timing T222 sends out the result of the "request for call attempt retrieval" (Response) 222 to the information retrieving accessing subsection 100. The information retrieving accessing subsection 100 at a timing T224 further returns the so supplied result 222 as an executed result (Result) 224 of the component AP interface 102 in the CA manager 82 to the CMS application 80. The CMS application 80 processes the retrieved results 224 of the call attempt and the task involving the entity which made the display request, in the display format. At a timing T226, the CMS application sends out display data 226 thus processed to the Web browser 50 for display thereon. By the above sequence of operations, the user is able to check the Web browser 50 on the viewing screen for monitoring from client to client. This also allows confirmation of a job pertinent to a re-request as well as the communication history of a completed job. A case where a task is re-requested from the Web browser 50 under monitoring will hereinafter be described.

The user selects a task displayed on the monitor screen of the Web browser 50, and, at a timing T228, requests the CMS application 80 to display the history (Disp._REQ.228). In the description, the history displayed is a re-requested task for a description purpose. The CMS application 80 at a timing T230 requests the Web database 36 to retrieve a call attempt matched to the task (Search_REQ.) 230. The Web database 36 detects the component AP interface 102 from the task-call attempt list, and, at a timing T232, forwards the retrieved result (Search_RES.) 232 to the CMS application 80. Based on the retrieved result of the call attempt, the CMS application 80 exploits the component AP interface 102 in the CA manager 82, and generates a boot signal 236 for the information retrieving accessing subsection 100. The CMS application 80 at a timing T234 sends out a boot signal 234 to the information retrieving accessing subsection 100. The information retrieving accessing unit is booted, responsive to the so supplied boot signal 234, to generate a boot signal 236 for the cooperation manager 78. The information retrieving accessing subsection 100 at a timing T236 sends out the boot signal 236 to the cooperation manager 78.

The cooperation manager 78 uses one of the SOAP and CORBA protocols, in order to transmit the information 232, obtained on retrieval in the Web database 36, to the CA manager 54. The cooperation manager 78 at a timing T238 sends out a "call attempt information retrieving request" 238, generated at a timing T238 in the CMS application 80, to the cooperation manager 56, existing in another domain on the SOAP/CORBA network 16. The cooperation manager 56, FIG. 7B, generates a boot signal 240 for the information retrieving subsection 74 within the CA manager 54, inclusive of the "request for call attempt information retrieval" 238 received. The cooperation manager 56 sends out the boot signal 240, generated at a timing T240, to the information retrieving subsection 74. The information retrieving subsection 74 is responsive to the so supplied boot signal 240 and, at a timing T242, issues a command (Search 242) to the SIP database 24 for retrieving a counterpart entity from one task to another. The SIP database 24 at a timing T244 sends the completion of the information retrieval in the call attempt (Response) 244 to the information retrieving subsection 74.

The information retrieving subsection 74 generates a boot signal 246 for the cooperation manager 56. The information retrieving subsection 74 at a timing T246 sends out the generated boot signal 246 to the cooperation manager 78. The cooperation manager 78 at a timing T250 uses one of the SOAP and CORBA protocols for sending the task-based retrieved results 244 of the counterpart entity as a response to the CA manager 82. The cooperation manager 78 at a timing T250 sends out the response 250 to the CA manager 82, FIG. 7A, as the result 248 for the "call attempt information retrieving request" issued.

The CA manager 82 at a timing T252 returns the result as the executed result (Result) 252 of the component AP interface 102 to the CMS application 80. The CMS application 80 then processes the history information for the task so that the information may be displayed on the client's Web browser 50. The history information may include a counterpart entity under communication, a communication period of time and communication means. The CMS application 80 at a timing T254 sends out the processed display data (Disp._DATA) 254 to the Web browser 50. In the Web browser 50, the user selects the re-request destination from the displayed history information indicating the previous communication. The Web browser 50 at a timing T256 is responsive to this selection to output a connection request (Connect_REQ.) 256 to the CMS application 80.

The CMS application 80 at a timing T258 boots the cooperation manager 78 to actuate the cooperation manager 56 via SOAP/CORBA network 16. The CMS application 80 also communicates with the SIP-AP server 26/SIP server 22, shown in FIG. 7B, to request the "call setup" (Call_REQ.258) between the SIP client 46, the selected contact destination, and the SIP client 48, the user.

The SIP-AP server 26/SIP server 22 exploits the sequence of, e.g. 3PCC (3rd Party Call Control), and at a timing T260 transmits a call control signal (Call_CON.) 260 to the SIP client 46 as the selected contact destination. In a similar manner, the SIP-AP server 26/SIP server 22 at a timing T262 transmits a call control signal (Call_CON.) 262 to the SIP client 48 of the user. As a result, a call is set up between the SIP clients 46 and 48.

The Web browser 50 thus displays a list of tasks requested by the user, task requests from a third party and the working state thereof, and the user clicks his or her pointing device to designate a task of interest on the list. It is thus possible not only to confirm the history information of the communication but also to make a re-request simply on clicking.

Next, the input of a task and a message will now be described. The operational sequence for requesting data for display on the viewing screen to the CMS application 80 may be the same as that from the timing T10 to the timing T44, so that the description thereof is omitted and only the processing subsequent thereto will be described. The data request for display on the viewing screen up to the above-mentioned time point shall be directed to a message. Referring to FIG. 8, after the image frame indicating a selected contact destination is displayed on the screen, not shown, the Web browser 50 at a timing T270 issues a switching of a message image (Disp. SW 270) to the CMS application 80. The CMS application 80 at a timing T272 outputs display data of the message image (Disp._DATA) 27 to the Web browser 50. The Web browser 50 prepares an image consistent with the supplied display data 272 for demonstration thereon.

The message requester enters the names of the task and message text on the Web browser 50 by inputting means, such as a keyboard or a mouse. The Web browser 50 at a timing T274 issues a request to the CMS application 80 to register the information on the name of the task and the message text (Reg._REQ. 274). The CMS application 80 is responsive to the registration request 272 and, at a timing T276, registers the information on the message and call attempt on a task-call attempt registration list of the Web server 34 (Registration 276).

The Web server 34 at a timing T278 issues a notification of the end of the registration (Reg._Notify) 278 to the CMS application 80. The CMS application 80 at a timing T72, FIG. 6B, boots the status setting accessing subsection 92. As from this time, the communication system 10 executes the operational sequence, shown in FIGS. 6B and 7A, to register the message waiting status in the SIP database 24. The operation is continued until a timing T92 when the end of the registration is sent to the Web browser 50.

By this operation, messages may be transmitted to the counterpart entity, even if he or she is absent. Since messages are managed also under the call attempt, the status for a task is changed or updated, when the counterpart entity has unsealed a message, from the message waiting state to the response waiting state.

Description will be made on unsealing a message by monitoring. Since the monitoring operation for this case may be the same as until the transmission of the display data 226 shown in FIG. 7A at the timing T226 through the processing at the timing T200, FIG. 7A, and the processing shown in FIG. 7B, as described above, the description on the operation in the monitoring is omitted for avoiding the redundancy. For the present embodiment, it is assumed that a request has been issued from the Web browser 52.

The Web browser 52 displays a client-based monitor frame on its viewing screen. Specifically, the task "There's a message" is displayed on the monitor screen of the Web browser 52. If, as shown in FIG. 9, the user has designated a relevant task upon clicking, the Web browser 52 at a timing T280 issues a message display request (Message._REQ.) 280 to the CMS application 80. The CMS application 80 at a timing T282 requests the Web database 34 to retrieve a message matched to the task of the request entity (Search 282). The Web server 34 retrieves the messages and, at a timing T284, transmits the retrieved results (Result) 284 to the CMS application 80.

The CMS application 80 at a timing T286 sends the message contents, obtained from the Web database 34 on retrieval, as display data (Disp._DATA) 286, to the Web browser 52. The Web browser 52 displays the so supplied display data on the viewing screen. The CMS application 80 sends out the message contents to the Web browser 52, for display thereon, and at the same time it generates a boot signal 288 for the status setting accessing subsection 92. The CMS application 80 at a timing T288 sends out the boot signal 288 to the status setting accessing subsection 92. The CMS application 80 exploits the component AP interface 102 within the CA manager 82 and drives or boots the status setting accessing subsection 92, based on the so supplied boot signal 288.

Upon unsealing, the status of the present embodiment is changed from its message waiting state to its response waiting state. Since the status change is the same as that of the operational sequence as from time T74 until time T88, FIG. 6A, the corresponding description is omitted for avoiding the redundancy. In the SIP database 24, the status setting is changed from the message waiting to the response waiting, and a response signal 188 indicating the completion of the change may be obtained by the CA manager 82. The status setting accessing subsection 92 of the CA manager 82 at a timing T290 sends out the result of the status change 290 to the CMS application 80. The CMS application 80 processes the result of the status change 290 to generate display data 292 to send out the display data at a timing T292 to the Web browser 52. The Web browser 52 displays the updated status on the monitor screen on the Web browser.

The flow and the status of the progress of a "non-routinized work" may-be managed or monitored on a real-time and task-specific basis on the Web browser, based on the scheme of managing the recording of the VoIP communication, as booted from the Web browser, in association with the state of accomplishment of the objective of communication, and supporting by the system of execution of the communication and the accomplishment of the objective. In particular, it is possible in this manner to manage the detailed progress under management between the milestones in the work flow of the information-based system, which was so far not possible to achieve with ease.

By doing so, in the case an emergent task has occurred in a task organization, its task (objective) may be entered by the CMS application on the Web to carry out communication whereby it is possible to synchronize the task with the communication status to support the accomplishment of the objective. On the display, the contents of the matter of confirmation or request the user has made and the results thereof are displayed in real time. In this manner, loosing or forgetting a task may be prevented, while the task efficiency may be improved appreciably, as well as the effective use of the communication history removes the necessity of checking and inputting the telephone number of a counterpart entity.

An alternative embodiment of the communication system 10 will now be described exploiting the service providing system of the present invention. The communication system 10 basically uses the components which are the same as those of the previous embodiment. The present alternative embodiment maybe the same as the previous embodiment except for including a voice mail application 294 installed on the SIP application 30, as shown in FIG. 10. The voice mail application 294 has the function of recording and reproducing a speech or voice signal consistent with the SIP protocol.

Several operational sequences will now be described in which the CMS application 80 exploiting the CA manager 82 in the communication system 10 of the present embodiment cooperates with the voice mail application 294. First, the operational sequence until the communication system 10 registers voice message supplied from the Web browser of this embodiment will be described. This is a sequence in which, when a counterpart entity is not available, the SIP-based voice mail application 294 on the SIP server 22 is booted from the Web browser to register the speech. The operation from a request for displaying a message frame to displaying the message input frame may be the same as the operation for timings T10-T44 and for timings T270 and T272, and hence the description will be omitted for avoiding redundancy.

Figure 11A:
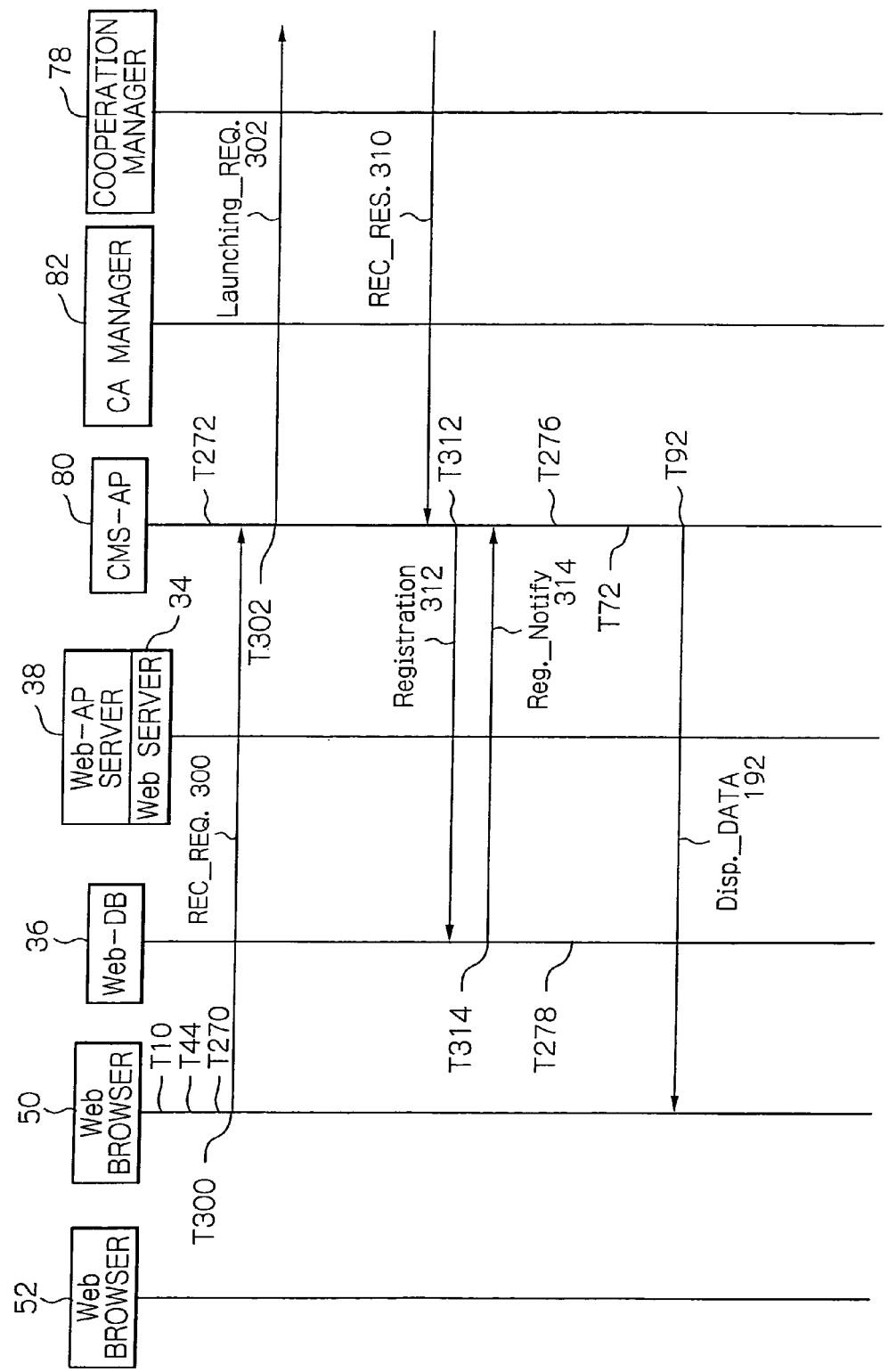

Referring to FIG. 11A, the Web browser 50 at a timing T300 issues a speech recording request (REC_REG) 300 to the CMS application 80. This request is issued on clicking a voice mail button on the image frame displayed on the Web browser 50. The CMS application 80 at a timing T302 sends out a boot request (Launching_REQ.) 302, inclusive of information on a speech record request 300, to the voice mail application 294 in the SIP-AP server 26. This transmission will now be described sequentially.

The CMS application 80 boots the cooperation manager 78. The cooperation manager 78 selects a common communication protocol in the cooperation managers 78 and 56, in the communication via SOAP/CORBA network 16, to send out the speech record request (REC_REG) 300 to the cooperation manager 56. The cooperation manager 56, FIG. 11B, sends out the speech record request 300 through the CA manager 54 to the SIP-AP server 26/SIP server 22. The SIP-AP server 26/SIP server 22 generates a boot signal 304 for the voice mail application 294. The voice mail application 294 at a timing T304 forwards the boot signal 304 to the voice mail application 294.

The voice mail application 294 at a timing T306 delivers a message for starting the recording (Message) 306 to the SIP client 46, the speech recording requester. The SIP client 46 enters a voice message (V._Message) 308, and, at a timing T308, sends out the message to the voice mail application 294. Briefly, the voice mail application 294 at a timing T310 sends out a response signal (REC-RES) 310 to the voice recording request, inclusive of the speech message, to the CMS application 80 through the SIP-AP server 26/SIP server 22 and the cooperation managers 56 and 78. It is to be noted that the speech message, included in the response signal 310, has been applied to the common communication protocol which has selected the SOAP/CORBA network 16 between the cooperation managers 56 and 78, and that the thus applied communication protocol has been supplied to the cooperation manager 78.

The CMS application 80 at a timing T312 sends out the received response signal 310 to the Web database 36 in the form of registration signal (Registration) 312. The Web database 36 registers the speech message included in the so supplied registration signal 312. The Web database 36 at a timing T314 sends out the results of completion of the registration (Reg._Notify) 314 to the CMS application 80.

As from this time, through timings T276 and T278, shown in FIG. 8, status change processing is registered at timings T72-T92 in the SIP database 24, and the completion of the registration is displayed on the Web browser 50. As the status, message waiting is here registered.

The communication system 10 causes the message image to be displayed in the Web system 14, requests the SIP client 46 to record the speech, registers the voice message of the SIP client 46 from the voice mail application 294 of the SIP system in the Web database 36, and registers the status changed in the SIP database 24. Concomitantly, the status change may be displayed on the Web browser 50.

With reference to FIGS. 12A and 12B, it will now be described how to reproduce a speech message from monitoring in the communication system 10. As for the monitoring, the operation for timings T200-T226, shown in FIG. 9, is carried out, and the message display for timings T280-T286 is made on the operation made from the monitor screen. On the Web browser 52, then the user clicks the indication 'there is a message' to issue a reproduction request (Reproduction_REQ.) 320 at a timing T320 to the CMS application 80. The CMS application 80 at a timing T322 retrieves the speech message file, registered in the Web database 36 (Search 322).

Figure 13:
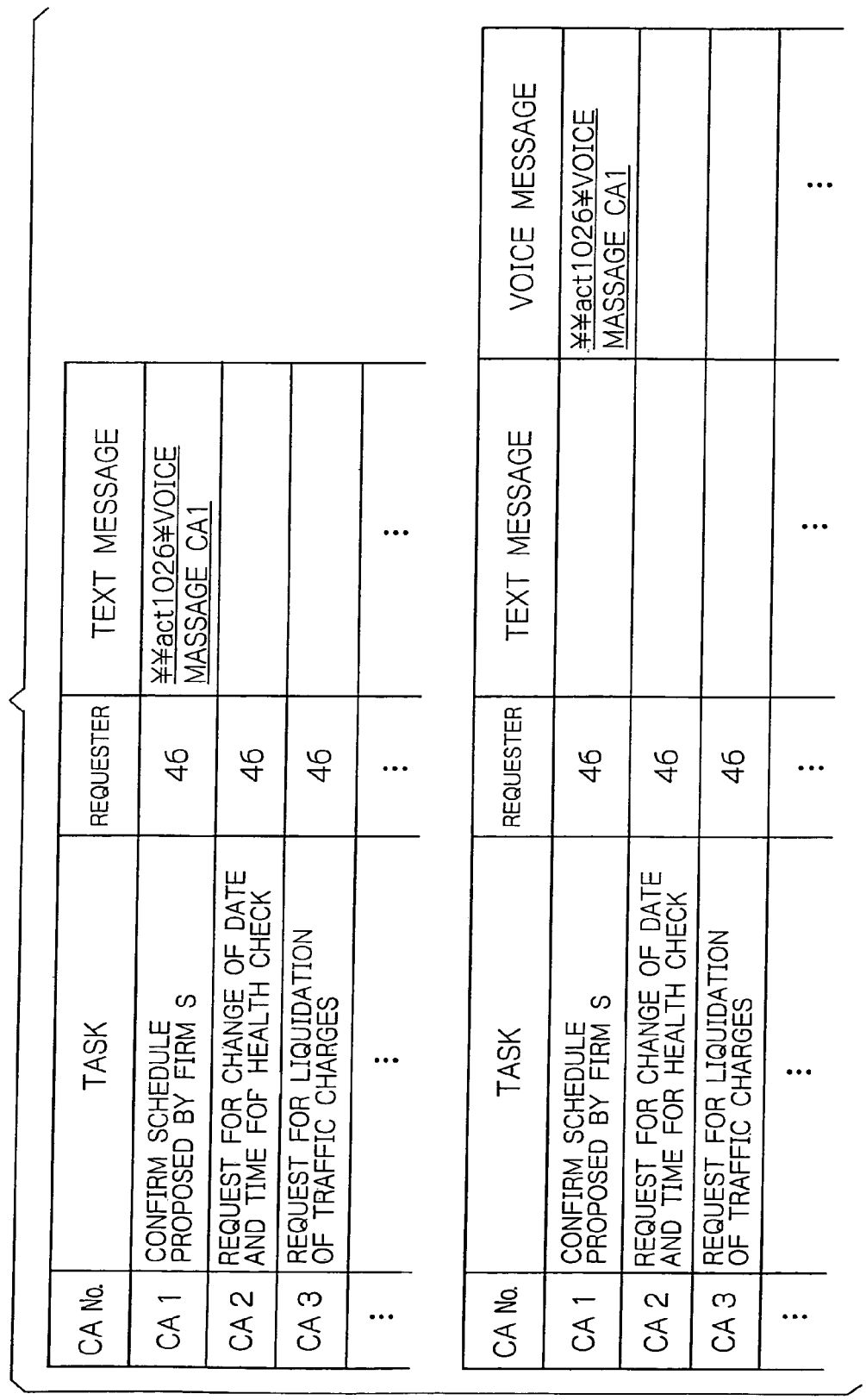
FIG. 13 shows an example of a task-call attempt-message list managed by the Web database.

In the Web database 36, information is registered for the items of call attempt numbers (CA Nos.), tasks, clients and text messages, or call attempt numbers (CA Nos.), tasks, clients, text messages and voice messages, as shown in FIG. 13. The Web database 36 at a timing T324 sends out the retrieved results (Response) 324 of the registered speech message file to the CMS application 80.

Briefly, the CMS application 80 at a timing T326 sends out a boot signal 326, including information on a request for reproducing a speech message, to the SIP-application server 26/SIP-AP server 22, through the cooperation managers 78 and 56 processing the linkage for different systems. The SIP-application server/SIP-AP server 26 generates a boot signal 328 for launching the voice mail application 294. The SIP-application server SIP-AP server 26 sends out the boot signal 328, generated at the timing T328, to the voice mail application 294. The voice mail application 294 reproduces the registered speech. The voice mail application 294 at a timing T330 sends out the reproduced registered speech, that is, the message speech (V._Reproduction) 330 to the SIP client 48 as the entity made the request for reproducing the message speech.

If the indication 'there is a message' in a status indicator for the task name is clicked on the monitor screen of the Web browser 52, the voice mail application 294 in the SIP application 30 is booted, and the speech is reproduced into a voice signal, which will then be sent to the SIP client 48. Since the Web-VoIP cooperative type of application may be constructed, executed and managed readily, the voice recording and reproduction, employing the VoIP technique, may be implemented readily.

Figure 14A:
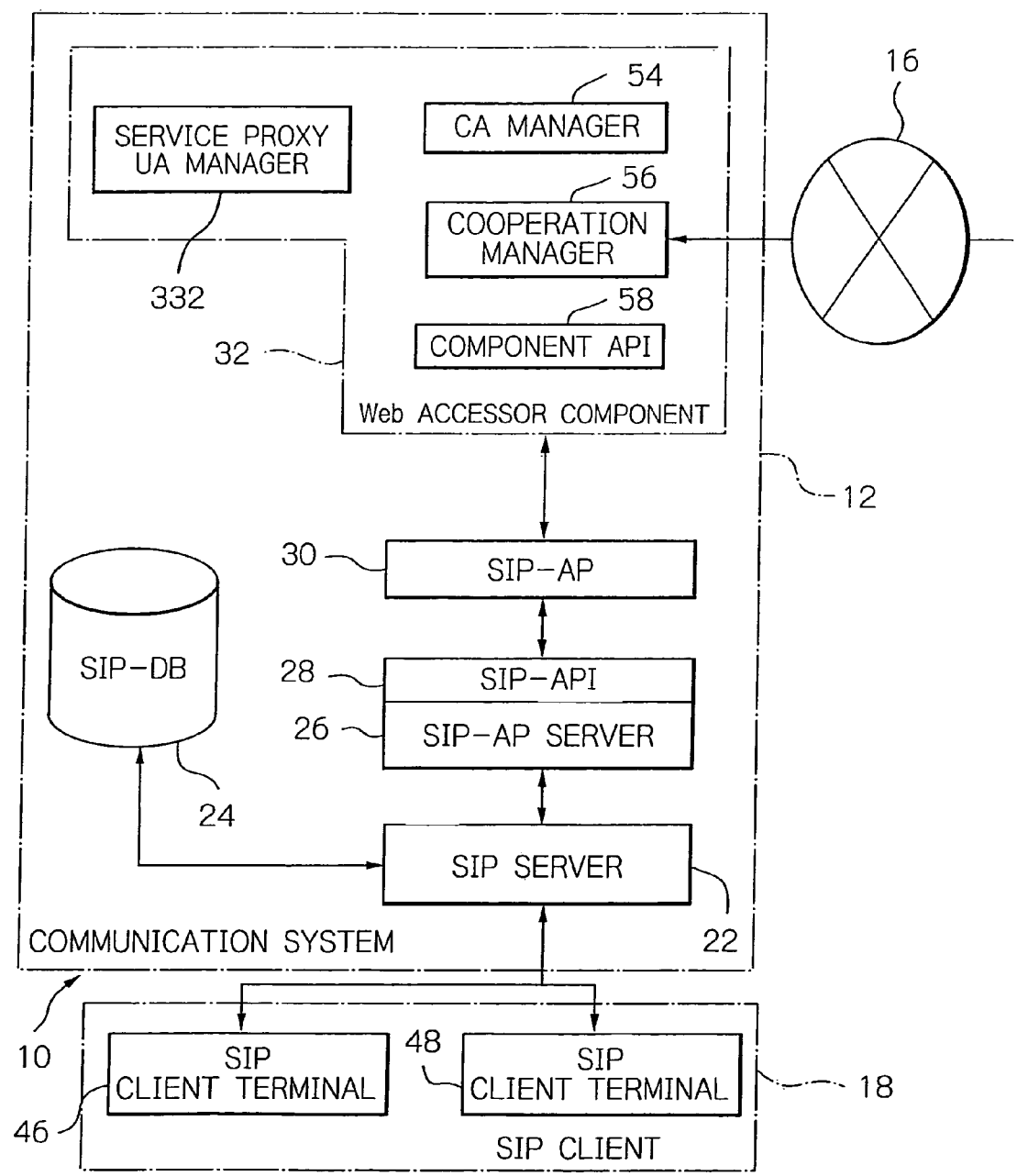
FIGS. 14A and 14B are schematic block diagrams showing a configuration of an alternative embodiment of a communication system employing the service providing system of the present invention.
Figure 14B:
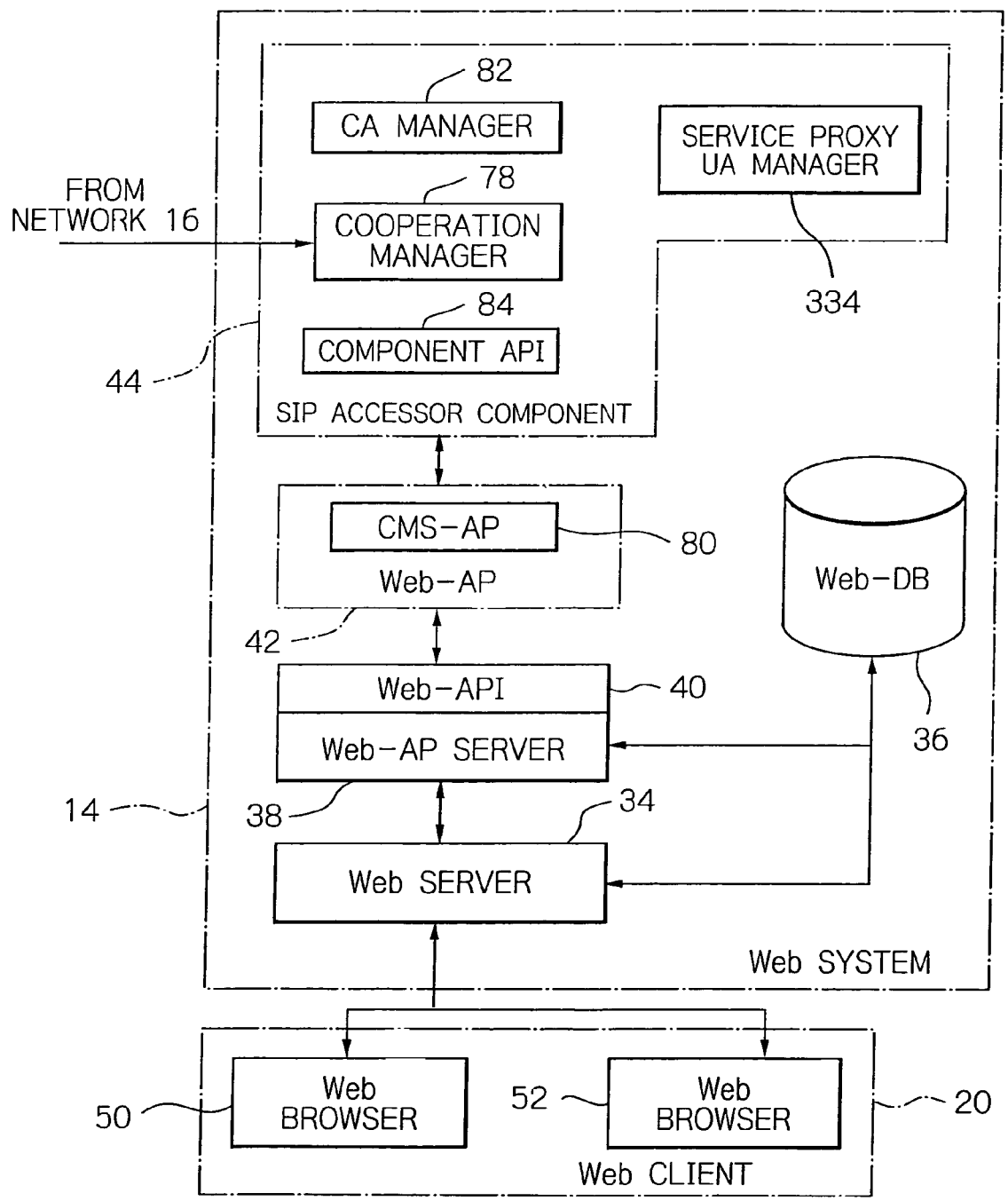

Another alternative embodiment in the communication system 10 will now be described, referring to FIGS. 14A and 14B, employing the service providing system of the present invention. The communication system 10 basically may include the same components as those of the previous embodiments. However, the Web accessor component 32 of the SIP system 12 includes a service proxy UA manager 332, in addition to the CA manager 54, the cooperation manager 56 and the component AP interface 58. The SIP accessor component 44 of the Web system 14 includes a service proxy UA manager 334, in addition to the CA manager 82, the cooperation manager 78 and the component AP interface 84.

Figure 15A:
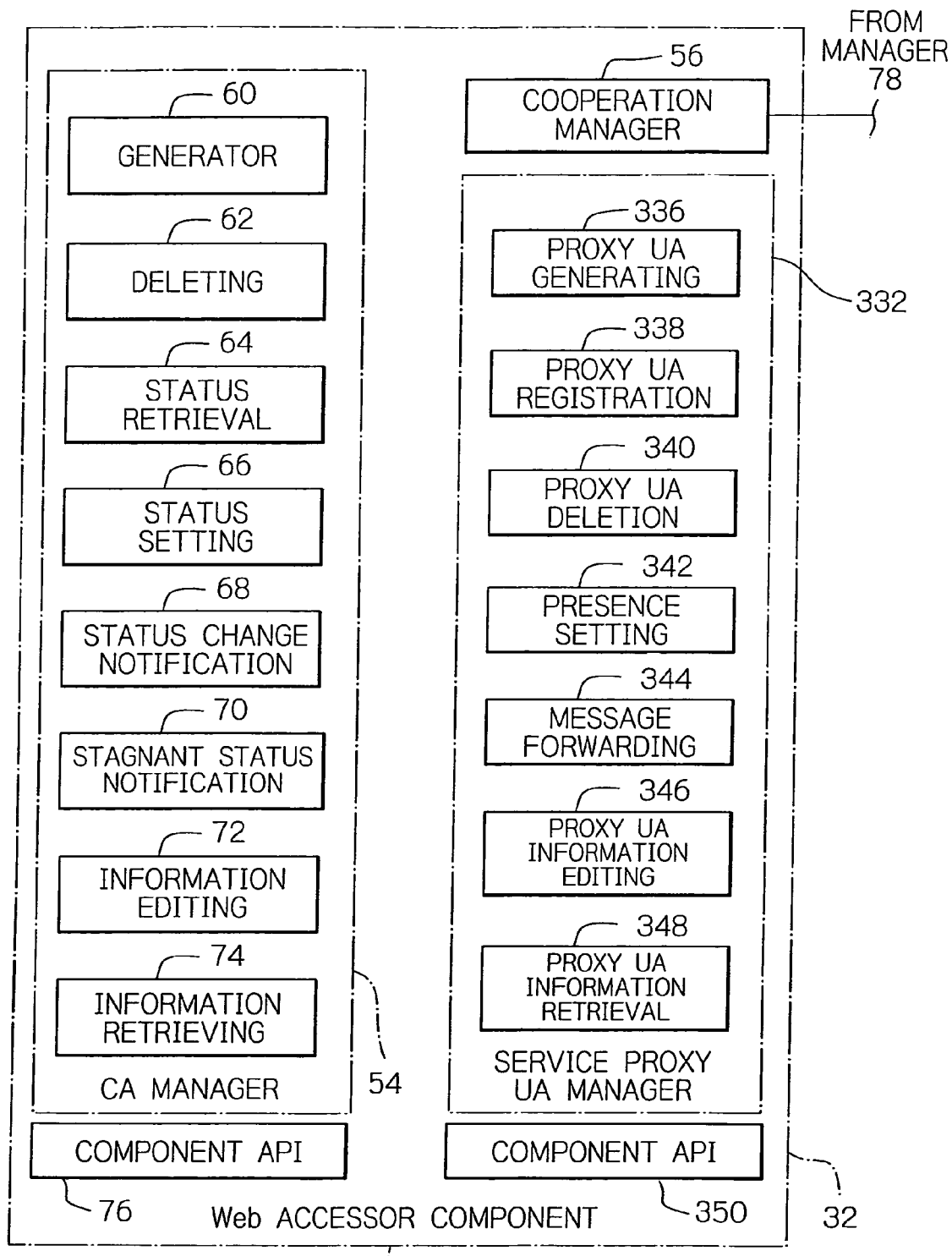
FIGS. 15A and 15B are block diagrams respectively showing the configuration of the Web and SIP accessor components included in the communication system shown in FIGS. 14A and 14B.
Figure 15B:
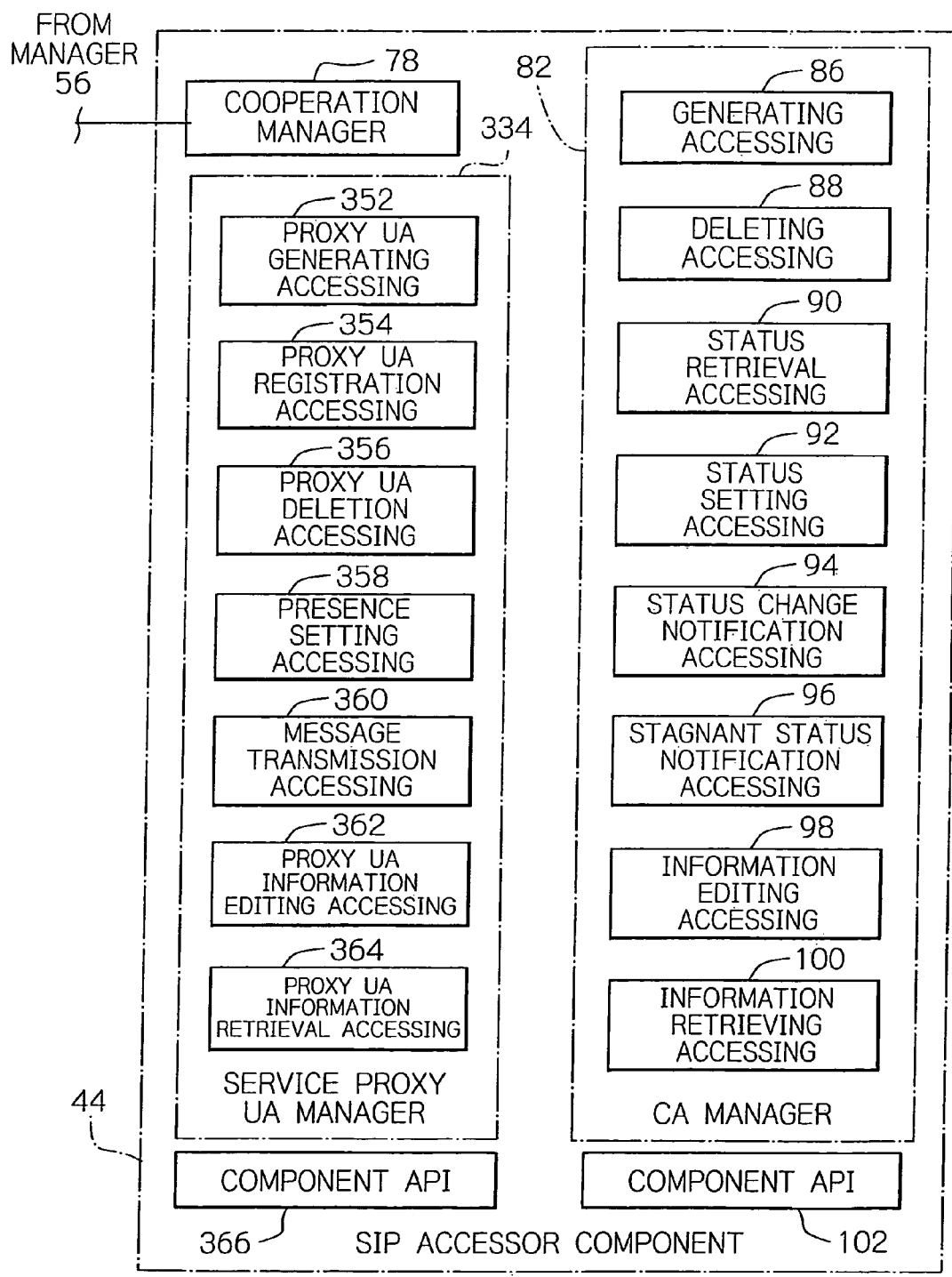

The service proxy UA managers 332 and 334 will be described further with reference to FIG. 15. The service proxy UA manager 332 has the function of operating and managing the service proxy UA information managed in the SIP system 12 of the SIP management. The service proxy user agent implements services as a user agent which virtually transmits a request and a response between SIP clients deemed to be equivalent to service instances.

The service proxy UA manager 332 includes, as representative functional modules, a proxy UA generating subsection 336, a proxy UA registration subsection 338, a proxy UA deletion subsection 340, a presence setting subsection 342, a message forwarding subsection 344, a proxy UA information editing subsection 346 and a proxy UA information retrieval subsection 348. The proxy UA generating subsection 336, the proxy UA registration subsection 338 and the proxy UA deletion subsection 340 include the functions of generating, registering and deleting a user agent associated with a service instance. The presence setting subsection 342 has the function of changing or updating the presence information of a user agent associated with a service instance. The message forwarding subsection 344 includes the function of transmitting a message to a user agent specified from the user agent corresponding to the service instance. The message may be enumerated by, for example, a text string.

The proxy UA information editing subsection 346 has the function of editing the user information of the user agent equivalent to the service agent. Lastly, the proxy UA information retrieval subsection 348 includes the function of retrieving the user function of a user agent equivalent to a service instance.

A component AP interface 350 is included in the component AP interface 84, FIGS. 1 and 14. The component AP interface 350 is for the SIP application 30 to exploit the service proxy UA manager 332.

The service proxy UA manager 334 includes a functional unit for accessing subsections included in the SIP environment side service proxy UA manager 334 through communication with the cooperation managers 56 and 78. The service proxy UA manager 334 includes a proxy UA generating accessing subsection 352, a proxy UA registration accessing subsection 354, a proxy UA deletion accessing subsection 356, a presence setting accessing subsection 358, a message transmission accessing subsection 360, a proxy UA information editing accessing subsection 362 and a proxy UA information retrieval accessing subsection 364.

The proxy UA generating accessing subsection 352, the proxy UA registration accessing subsection 354 and the proxy UA deletion accessing subsection 356 are modules for accessing the proxy UA generating subsection 336, the proxy UA registration subsection 338 and the proxy UA deletion subsection 340 in the service proxy UA manager 332 in the SIP system 12 from the inside of the Web system 14. The presence setting accessing subsection 358 is a module responsive to a change in the service presence state to access the presence setting subsection 342 of the service proxy UA manager 332 from the service proxy UA manager 334 to change or update the presence of a proxy user agent. The result of the presence change is transmitted through the SIP server 22 to the watcher for the presence information.

The message transmission accessing subsection 360 is a module responsive to a change in the state of a service process to access the message forwarding subsection 344 of the service proxy UA manager 332 to formulate or transmit a message of the proxy user agent. The message is notified to the receiving side via the SIP server 22.

The proxy UA information editing accessing subsection 362 and the proxy UA information retrieval accessing subsection 364 are modules for accessing the proxy UA information editing subsection 346 and the proxy UA information retrieval subsection 348 within the service proxy UA manager 332 of the SIP system 12 from the Web system 14.

In this manner, the subsections provided in the service proxy UA manager 334 may access the appropriate subsections provided in the service proxy UA manager 332 on the side SIP environment to provide for access from the Web environment side.

A component AP interface 366 is provided for use by the Web application 42. Referring to FIG. 15, the component AP interface 366 is provided in association with the service proxy UA manager 334, and is included in the component AP interface 84.

By the above configuration, the state of services managed as a call attempt, such as a completion, a re-request, and a reply or message waiting, is managed by the manager as a service presence, as with a presence representing the presence state of an individual. For example, if a to-do list, having the same level as a telephone directory, is opened, job tasks are listed on the display. Upon selection, the list is registered as a task-based buddy list in the manager's softphone to enable each service presence to be monitored. Since the browser is not of the Web but the SIP, a push-based presence service may be accomplished, so that tasks high in emergence or importance may reliably be managed.

Figure 16A:
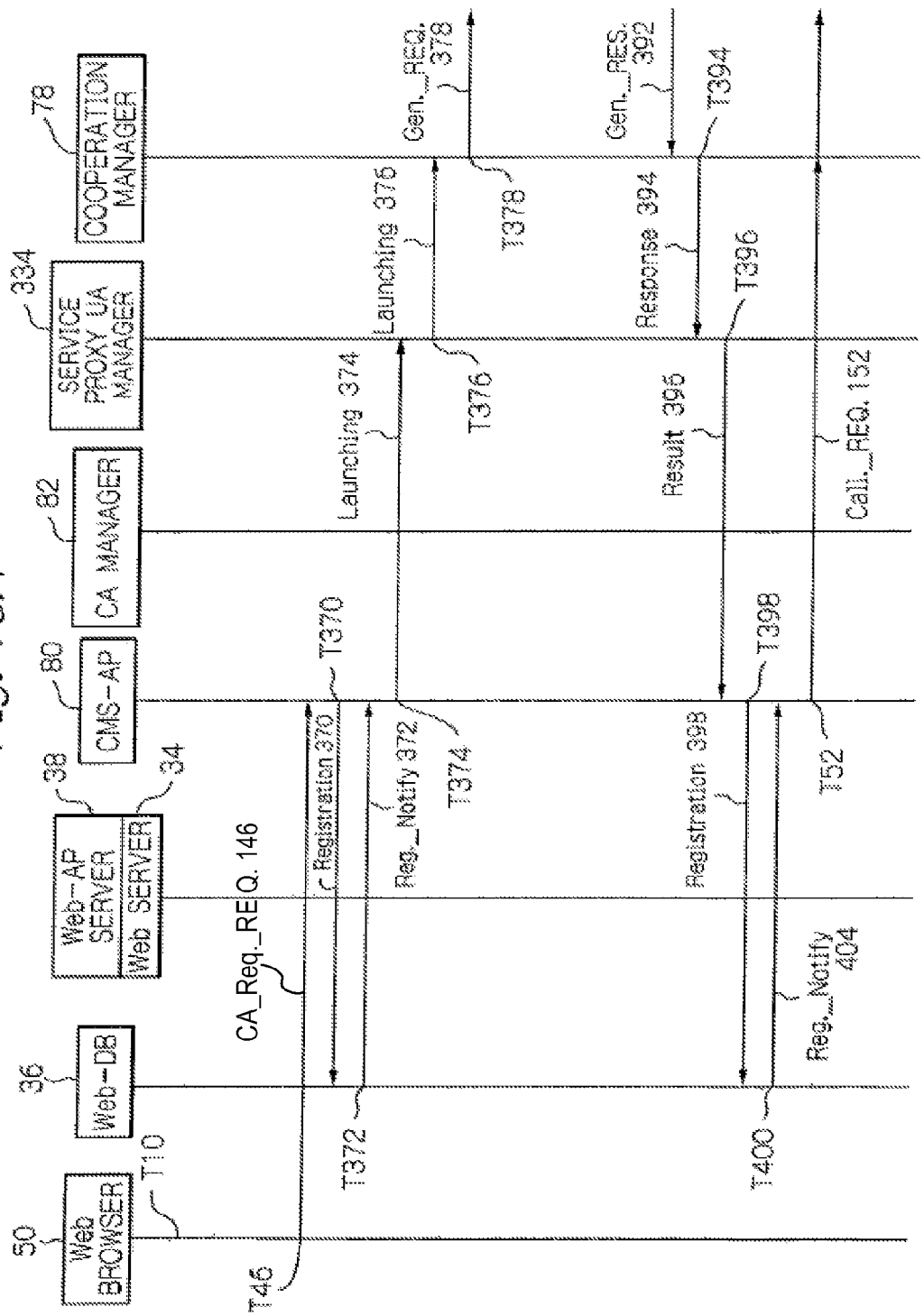

The operation in the above-described configuration will now be described. The communication system 10 is run by the same sequence as that shown in FIG. 3A. Specifically, the sequence runs in the same as from the browser 50 at the timing T10 shown in FIG. 3A through the processing shown in FIG. 3B up to the task registration request from the Web browser 50 at the timing T46, FIG. 3A. The CMS application 80 at a timing T370, shown in FIG. 16A, is responsive to the task registration request to register information on a task and a call attempt in the registration list of the Web database 36 (Registration 370). The Web database 36 at a timing T372 sends out a registration completion notification (Reg._Notify) to the CMS application 80. The CMS application 80 at a timing T374 sends out a boot signal 374, including the "service generation request (Gen._REQ), to the service proxy UA manager 334. This service proxy UA manager 334 boots the proxy UA generating accessing subsection 352, using the component AP interface 366. The proxy UA generating accessing subsection 352 outputs a boot signal 376, generated at a timing T376, to the cooperation manager 78.

The cooperation manager 78 at a timing T378 selects and uses one of the SOAP and CORBA protocols, as a common communication protocol, for generating and transmitting information for generating the proxy user agent by the service proxy UA manager 334, in order to communicate with the cooperation manager 56. This cooperation manager 56 generates a boot signal 380 inclusive of a generation request (Gen._REQ. 378). The cooperation manager 56, FIG. 16B, at a timing T380 sends out the boot signal 380 generated to the proxy UA generating subsection 336 of the service proxy UA manager 332. The proxy UA generating subsection 336 is booted, responsive to the boot signal 380, using the component AP interface 350 (Launching 382). The proxy UA generating subsection 336, thus booted, at a timing T382 generates the service proxy user agent for each task. The proxy UA generating subsection 336 at a timing T384 registers the information (Reg.-INF) 384 for the service proxy user agent, generated from task to task, in the SIP database 24.

The SIP database 24 at a timing T386 returns the registered result (Response) 386 to the proxy UA generating subsection 336. The proxy UA generating subsection 336 at a timing T388 outputs the received registered result 386 as a new registered result 388 to the service, proxy UA manager 332. The service proxy UA manager 332 at a timing T390 sends out the generated boot signal 390 to the cooperation manager 78.

For sending the generated SIP-URI (Uniform Resource Identifier) as a response to the service proxy UA manager 334, the cooperation manager 56 selects and uses one of the SOAP and CORBA protocols in order to communicate with the cooperation manager 78 at a timing T392 (Gen._RES.392). The cooperation manager 78 at a timing T394 sends out the received contents in the form of response signal 394 to the service proxy UA manager 334. The service proxy UA manager 334 at a timing T396 returns the executed result (Result) 396 of the component AP interface 366 to the CMS application 80. The executed result represents user information obtained on retrieval on the SIP database 24.

The CMS application 80 at a timing T398 sends out the UA information 398, supplied as the executed result 396, to the Web data base 36. The Web data base 36 additionally registers the UA information 398 in a task-call attempt list 400 shown in FIG. 17. This makes entry in a field of the UA number (UA No.) in the task-call attempt list 402 to complete the list. The Web database 36 at a timing T400 notifies the CMS application 80 of the completion of the registration (Reg._Notify) 404. The communication system 10 performs the processing by the same procedure as that from timing T52, FIG. 3A, until timing T56, FIG. 3B, to set up a call between the SIP clients 46 and 48.

Figure 18A:
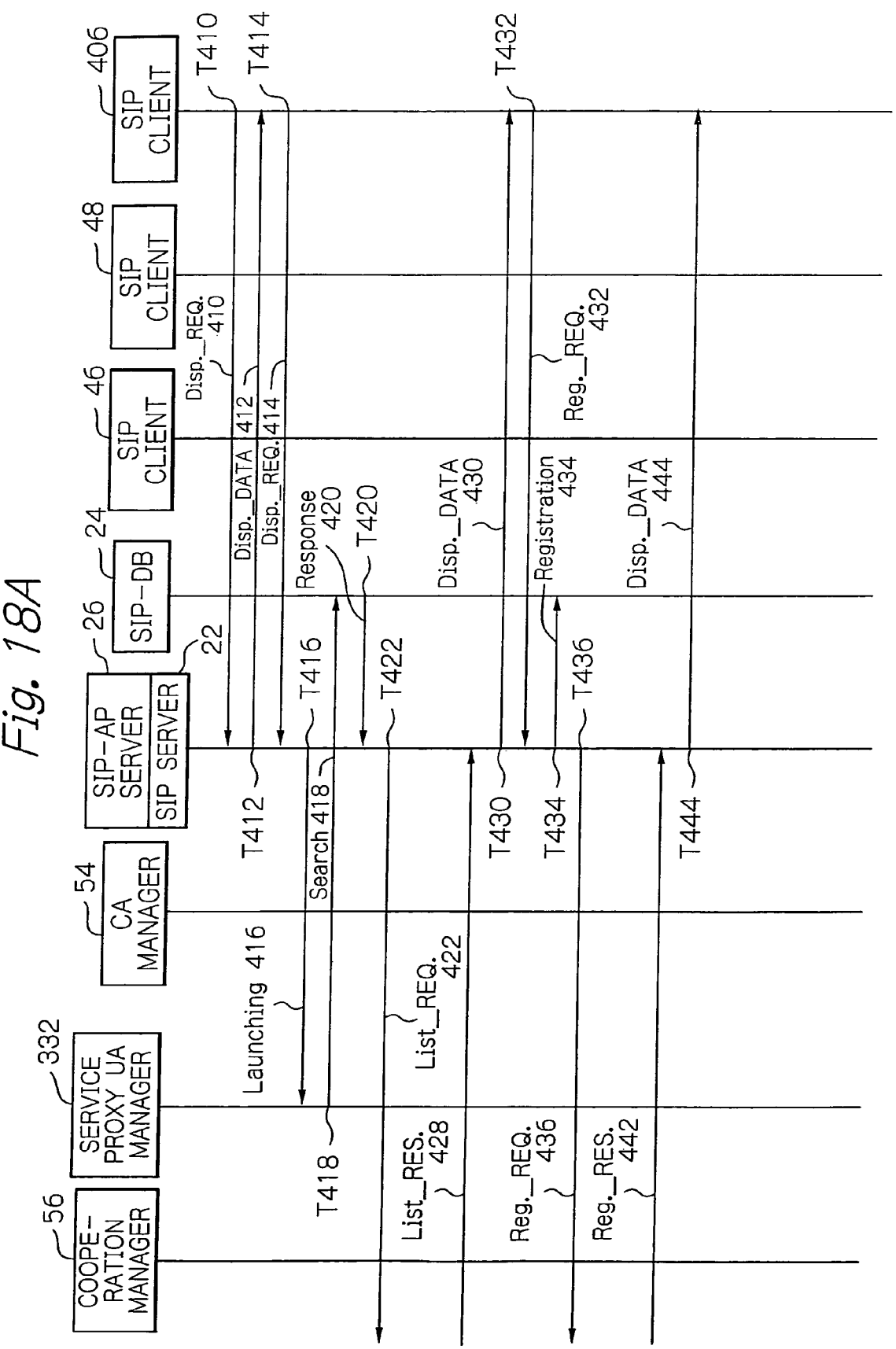
FIGS. 18A and 18B illustrate an operational sequence as from the selection of a task of monitoring until the end of registration in the communication system shown in FIGS. 14A and 14B.

The operation will now be described as from the task selection for monitoring by the manager to the completion of registration in the communication system 10. Referring to FIG. 18A, a SIP client 406 at a timing T410 issues a display request (Disp._REQ) 410 for a softphone picture frame to the SIP server 22/SIP-AP server 26. The SIP server 22/SIP-AP server 26 at a timing T412 sends out display data of the softphone frame (Disp._DATA) 412 to the SIP client 406 at a timing T414 for display of the softphone frame. The SIP client 406 issues a display request 414 for a list of proxy user agents. The list of proxy user agents corresponds to a list of tasks, managed by a call attempt, such as a to-do list shown in FIG. 17.

The SIP server 22/SIP-AP server 26 is responsive to a display request 414 to generate a boot signal 416 for booting the information retrieving subsection 74. The SIP server 22/SIP-AP server 26 at a timing T416 delivers the so generated boot signal 416 to the service proxy UA manager 332. The service proxy UA manager 332 boots the information retrieving subsection 74 to request the SIP database 24 at a timing T418 to retrieve the information (Search 418). The SIP database 24 at a timing T420 sends out the retrieved results (Response) 420 of the proxy user agent to the SIP server 22/SIP-AP server 26. The retrieved result 420 represents the registered proxy UA information.

Figure 18B:
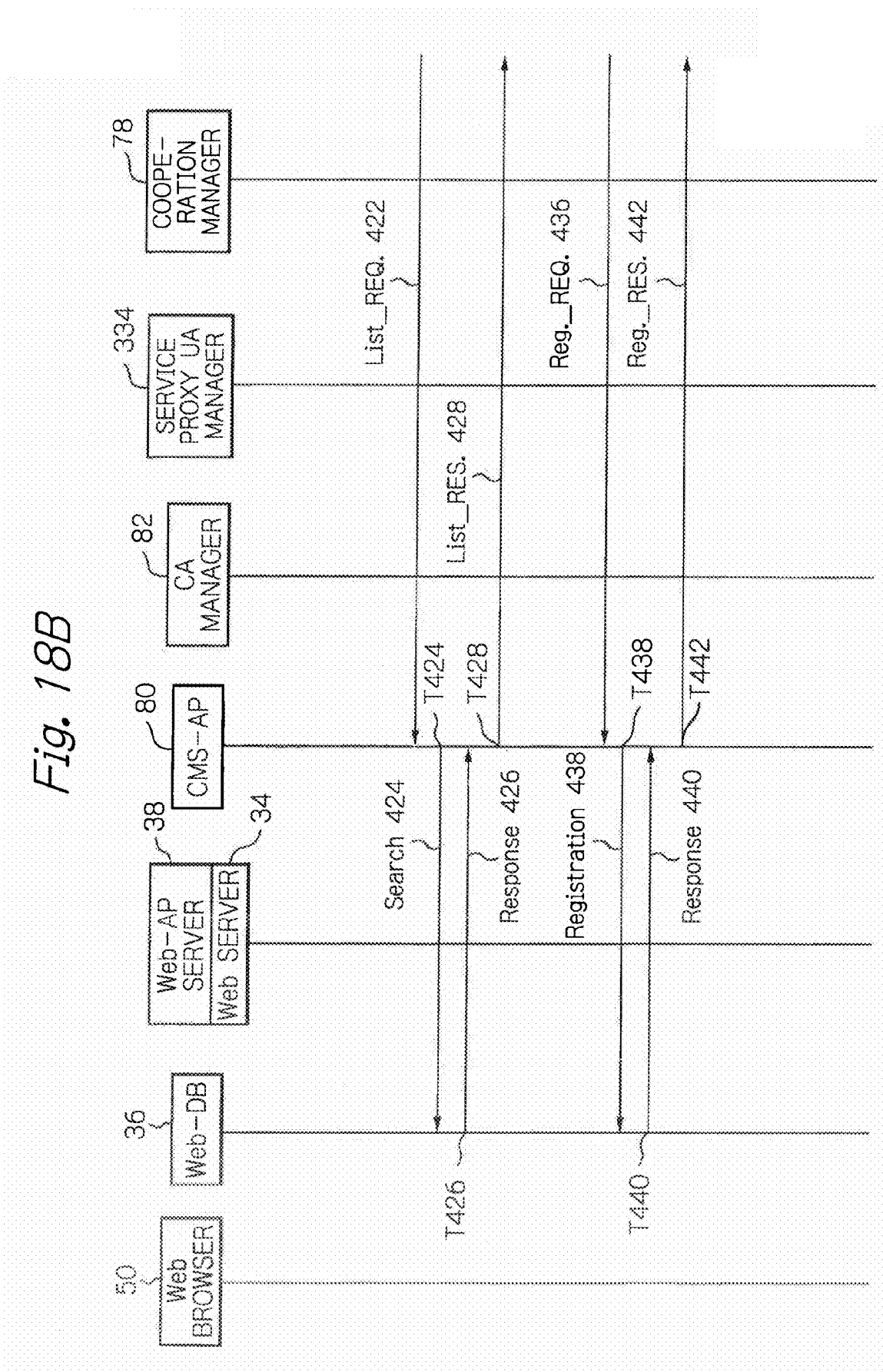

The SIP server 22/SIP-AP server 26 at a timing T422 develops information on the proxy user agent, obtained based on a display request 414 of "proxy UA list", that is, a request for the list of tasks (List_REQ.) 422. for the proxy user agent including the retrieved result 420, to the CMS application 80. The cooperation manager 56 is then booted and selects the common protocol to send out the task list request 422, shown in FIG. 18A, to the booted cooperation manager 78. The cooperation manager 78, FIG. 18B, further forwards this to the CMS application 80.

The CMS application 80 at a timing T424 requests retrieval of the task list registered in the Web database 36 (Search 424). The Web database 36 at a timing T426 sends out the result (Response) 426 of the task list to the proxy user agent to the CMS application 80. The CMS application 80 is responsive to the result 426 of the task list to send out the response of the task list (List_RES.) 428 at a timing T428 to the SIP server 22/SIP-AP server 26. The cooperation manager 78 is booted and selects the common communication protocol to send out the response of the task list 428 to the cooperation manager 56. The cooperation manager 56 further forwards the response to the SIP server 22/SIP-AP server 26.

The SIP server 22/SIP-AP server 26 at a timing T430 feeds the SIP client 406 made the request with display data 430 representative of the task list. The SIP client 406 demonstrates the display data 430, supplied thereto, on the viewing screen thereof. The SIP client 406 selects the task to be monitored on the task list displayed, and, at a timing T432, issues a registration request (Reg._REQ.) 432 to the SIP server 22/SIP-AP server 26. The SIP server 22/SIP-AP server 26 at a timing T434 registers the task, to be displayed on the SIP client, in the SIP database 24, based on the registration request 432 received from the SIP client 406 (Registration 434). Substantially simultaneously, that is, at a timing T436, the SIP server 22/SIP-AP server 26 issues a registration request (Reg._REQ) 436 of the client being monitored to the CMS application 80. With this issuing, the cooperation managers 56 and 78 again select and use the common communication protocol to send out the information of the registration request 436 to different communication systems. This monitoring client is termed a watcher.

The CMS application 80 at a timing T438 registers the client, as the subject under monitoring, in the Web database 36 (Registration 438). It is noted that the list of tasks shown in FIG. 19 corresponds to the list shown in FIG. 17 with the watcher (monitoring entity) added. The watcher indicates the entity being monitored by the client and the URI of the subject under monitoring. The Web database 36 at a timing T440 sends out a response signal 440, indicating the end of the registration, to the CMS application 80.

The CMS application 80 at a timing T442 notifies the SIP server 22/SIP-AP server 26 of the end of registration (Reg._RES.) 442. For the notification of the end of registration, the cooperation managers 78 and 56 again select and use the common communication protocol to send out the information of the end of registration 442 to the different communication systems. The SIP server 22/SIP-AP server 26 at a timing T444 sends out display data 444 of the registered task to the SIP client 406. The SIP client 406 displays the registered task.

In this manner, the manager is able to retrieve the task of the call attempt being managed from the softphone and to select and register only the tasks in need of management. The service presence (operating states) of the registered tasks is managed and notified in real time by each proxy user agent.

The operational sequence until message transmission attendant on a status change of a call attempt in the communication system 10 will now be described. Referring to FIG. 20A, when the status of a call attempt is changed, the SIP database 24 at a timing T450 issues a status change notification (Status_CHG) 450 to the proxy UA information retrieval subsection 348. Using the selected communication protocol, common to the different systems, the proxy UA information retrieval subsection 348 requests the CMS application 80, shown in FIG. 20B, to retrieve the watcher (Search_REQ.) 452, through the cooperation managers 56 and 78.

The CMS application 80 at a timing T454 outputs a watcher retrieving request 454 to the Web database 36. The Web database 36 at a timing T456 sends out retrieved result (Response) 456 to the CMS application 80. The retrieved result 456 represent the address of a watcher. The CMS application 80 at a timing T458 transmits the retrieved result 458 to the proxy UA information retrieval subsection 348. In the transmission of the retrieved result 458 also, the common communication protocol selected by the cooperation managers 78 and 56 are exploited in this order to transmit, by communication between different systems, the retrieved result to the proxy UA information retrieval subsection 348.

The proxy UA information retrieval subsection 348 at a timing T460 boots the message forwarding subsection 344 in the service proxy UA manager 332 (Launching 460), although not specifically shown in FIG. 20A. The message forwarding subsection 344 at a timing T462 sends out a message (Message) 462 representing that the operating state of the task has been changed as to all of the SIP clients registered as the subjects.

When the SIP client 406, as a subject, has clicked the confirmation button displayed on its viewing screen, the SIP client 406 at a timing T464 sends out a display request (Disp._REQ.) 464 for display on the monitor screen to the SIP server 22/SIP-AP server 26. The SIP server 22/SIP-AP server 26 at a timing T466 requests the CMS application 80 to display the monitor image frame on the Web browser (Disp._REQ.466). The display request 466 is also processed so as to be forwarded across different systems and sent to the CMS application 80.

The CMS application 80 at a timing T468 sends out display data 468 to the Web browser 50. The display data 468 are representative of the monitor screen showing the totality of the registered watchers. Thus, if the task or call attempt being monitored is changed, a message is sent out to all entities being managed.

By the above operation, a third party, for example, a team leader or manager of a project, other than the entities communicating with each other is able to grasp in real time the state of progress of the operation relevant to the project. Tasks may be managed readily, conforming to the conditions, such as emergency or importance, on respective managers. Whereas the pull-based display solely provided on the Web browser 50 would not necessarily cause the status to be displayed in real time, the push-based display is attained with the SIP protocol, and hence a complete real-time management is accomplished.

This embodiment described above is directed to the case including the service proxy user agent, the task and the call attempt. It is however possible for a sole service proxy user agent to manage plural tasks, or for a sole task to manage plural call attempts. In this manner, the statuses of plural communications carried out by plural persons may be managed for a sole objective. This sort of management may be exemplified by a proposal for a larger scale project. In such a project, tasks progress as plural businessmen or sales engineers communicate with plural contact men or personnel of a customer. It is then possible for plural persons to make plural communications, such as negotiations on the job or technical proposals, for accomplishment of the objective, such as system construction or contract establishment.

To summarize, communications between the SIP system 12 and the Web system 14 are made cooperative through the cooperation managers 56 and 78. Specifically, the CA manager 54 of the SIP system 12 is booted responsive to a request from the CA manager 82. For example, a call attempt is registered in the SIP database 24, the registered result is supplied to the Web system 14 for display in the Web client 20, and a task is entered and registered in the Web database 36, to provide a connection or a monitoring service between the SIP clients 46 and 48, interconnected to the SIP system 12. That may facilitate job and progress managements even with a "job difficult to routinize". In particular, forgetting or loss of a request in a job may be eliminated. Sophisticated progress management may become feasible between milestones in a work flow on an information-based system, which would so far be taken to be difficult. The efficiency on the side of workers may also be improved because it is unnecessary to check and enter the telephone numbers of a counterpart entity to communication with for a job.

The SIP system 12 includes the voice mail application 294, which operates in response to a message request or reproduction from the SIP client 46, desirous to communicate with the SIP client 48, in the SIP system 12. That renders the VoIP technique available from the Web browser 50 to thereby allow the voice from a counterpart entity under communication to readily be recorded and reproduced.

In the communication system 10, the SIP system 12 includes the service proxy UA manager 332, which deems a requested service instance as a client of the SIP system 12, and manages the so deemed service instance as a virtual proxy user agent to operate information. The Web system 14 includes the service proxy UA manager 334, which accesses the associated function of the service proxy UA manager 332 from the Web system 14 for a requested service instance through, the virtual proxy user agent, in order to acquire an executed result of the service instance. Thus, it be comes possible for, e.g. a manager, other than the entities under communication, to comprehend in real time the status of the progress of a job. In addition, the communication system 10 is able to manage a task consistent with a manager's request. The real-time processing, described above, is an impeccable real-time management accomplished by the push-based display by the SIP protocol, which could not be implemented with ease by the pull-based display displaying only on the Web browser 50.

In the communication system 10, preferably the first communication protocol is the SIP protocol, the second communication protocol is the HTTP protocol and the third communication protocol is one of the SOAP and CORBA protocols which may be handled by both the SIP and HTTP protocols.

The service providing method of the present invention selects the common communication protocol, by the cooperation managers 56 and 78, and establishes cooperative management by conversion to the SIP protocol, a selected common communication protocol and the HTTP protocol, as well as by the HTTP protocol, a selected common communication protocol and the SIP protocol, thereby providing for cooperative communications between the SIP system 12 and the Web system 14. More specifically, the service providing method of the present invention displays the state of communication, selects a client requested a task in displayed information for the client, requests access to an associated call attempt of the SIP system 12 from the Web system 14, sends out the call attempt to the SIP system 12 to generate and register the call attempt of the SIP system 12, displays a result attendant on the completion of the registration in the Web system 14, enters the task, registers the call attempt associated with the so entered task in a correlated fashion, and sets up communication to the client interconnected to the SIP system 12 responsive to the registered result, whereby efficient job processing may be achieved. Since it is sufficient to simply select a counterpart entity to communicate in a job, the operation of checking and entering the telephone number of the counterpart entity to communicate may be eliminated to thus improve the efficiency on the side of the operator.

The communication method in the communication system 10 places a request for establishment of communication to the SIP client, and, after established, forwards the status of a task through the communication to the Web browser of the Web system 14 in the form of status information, when the communication is ended, by communication adapted to be linked to an input image frame to display the task status. A change in the status is entered, and the status of a call attempt, thus entered, is forwarded to the SIP system 12 through communication cooperatively managed responsive to the change. The status setting function is started to change the registered status, and the result is forwarded to the Web system by the cooperatively managed communication, demonstrating the result of the status on the Web browser of the Web system 14. The change in the status can thus be comprehended on the Web system 14 side, in a manner favorable for managing the progress state. The status may be exemplified by a completion, a re-request, and response and message waiting.

The communication method in the communication system 10 enters a re-request of the status in the Web system, as from the time of display of a monitor image frame on the Web browser, requests and retrieves the history up to the current time, accesses the information retrieval of the SIP system 12 from the Web system 14, by the cooperatively managed communication, retrieves, based on a retrieved result, the destination of intended communication from one task to another, displays the retrieved result on the Web browser of the Web system 14, by the cooperatively managed communication, in the form of information to the history request, selects the destination of communication from the displayed information, and sends out a connection request again by the cooperatively managed communication, to establish communication to the client of the SIP system 12. The re-request task may thereby be executed from the Web system client to the SIP client system, thereby appreciably reducing the processing sequence on the side of an operator.

The communication method in the communication system 10 requests a message from the Web browser of the Web system 14, as from the time of displaying the monitor image frame on the Web browser, displays a message input image frame, enters a message, registers the message in the Web system 14, boots the status setting by the SIP system 12, by the cooperatively managed communication, responsive to a change in the status of a call attempt by the registration, sends out a result of the change to the Web system 14 by the cooperatively managed communication, and displays the status result on the Web browser. The message may thereby be registered in the web system, at the same time as the status of the SIP system may be changed to the message waiting-status, thereby allowing the operating state to be grasped readily.

The communication method in the communication system 10 retrieves and displays a message registered responsive to selection of a message displayed on the Web browser of the Web system 14, as from the time of displaying the monitor image frame on the Web browser, boots the status setting by the Web system 12 by the cooperatively managed communication, responsive to a resulting change in the status of a call attempt, to change the registered status, sends out the so changed result to the Web system 14 by the cooperatively managed communication, and displays the so changed result on the Web browser. The relevant message can thereby be selected and displayed on the Web browser, at the same time as the message status is changed on the SIP system side to, e.g. the response waiting status, thereby contributing to grasping the situation.

The communication method in the communication system 10 requests voice recording, as a message, as from the time of the display of a message input image frame, forwards the request to the SIP system 12 by the cooperatively managed communication to boot the voice mail application 294, forwards a message to the SIP client in the SIP system 12, relevant to the request, responsive to the booting, enters voice from the client, sends out information indicating the voice message to the Web system 14 from the voice mail application 294, by the cooperatively managed communication, registers the message based on the information, changes the status following the registration, and displays the status change. The voice by the SIP system 12 may thereby be entered responsive to a request from the client of the Web system 14 to display the presence/absence of a message by voice for the client of the Web system 14. By this manner, the communication system 10 may be improved such as to eliminate information loosing.

The communication method in the communication system 10 retrieves a voice message registered in the web system 14, responsive to a request for reproduction of recorded voice, as a message, as from the time of message retrieval and display, sends a request for reproducing the message, included in a retrieved result, to the voice mail application 294 of the SIP system 12, by the cooperatively managed communication, boots the voice mail application, reproduces the voice message by the booting, and sends out the voice message to the client. The emergency or importance which would not be expressed by a text message may thereby be imparted by recording the message voice to the counterpart entity.

The communication method in the communication system 10 selects from a displayed task to the client, following the inputting of the message, registers a task and a call attempt, boots the generation of a proxy user agent by the cooperatively managed communication, following the registration in the SIP system 14 responsive to an access request to the proxy user agent in the SIP system, registers it, sends out registration information of the proxy user agent to the Web system 14 by the cooperatively managed communication, registers both the task and the call attempt, subsequently requests a communication setup, and sets up the communication to the client of the SIP system 12. It is thereby possible to register the proxy user agent in the SIP system 12 from the Web system 14, as well as to register the task-call attempt—proxy user agent matching, from the SIP system 12 to the Web system 14, responsive to the task selection in the Web system 14, for example, selection of a transmit button, and to execute the task, e.g. a call setup, such as to improve the operating efficiency.

The communication method in the communication system 10 selects a common communication protocol by the cooperation managers 56 and 78, envisages the cooperation of the communication between the SIP system 12 and the Web system 14 by cooperative management by conversion to, e.g. the SIP protocol, a selected common communication protocol and the HTTP protocol, as well as to the HTTP protocol, a selected common communication protocol and the SIP protocol, receives a request for display of a list of proxy user agents from the client of the SIP system 12, retrieves the list, sends out the retrieved result to the Web system 14, retrieves the matching between the task and the proxy user agent, sends out the retrieved result to the client of the SIP system 12 having issued the request, selects and registers the task to be monitored from the displayed in formation, again registers the watcher in the Web system 14 responsive to the request for registration, supplies the result of registration to the client of the SIP system 12 having selected the monitor task, and displays the result of registration. A watching client may thereby grasp the operating state of the registered task through the proxy user agent. Specifically, an entity, such as a manager, other than the entities under communication is able to grasp the state of progress in real time. It is possible in this manner to simplify the management by the manager as well as to provide management free from loosing. Moreover, completely real-time management may be provided because the push-based display by the SIP protocol is now possible.

In addition, the communication method in the communication system 10 sends out a change in a status, which is of a task in the SIP system 12, to the Web system 14 by the cooperatively managed communication, retrieves, when a change is notified to a proxy user agent, a watcher relevant to the status change, transmits the retrieved result to the SIP system 12, by the cooperatively managed communication, in the form of message indicating the change in the status, sends out a request for displaying a monitor image frame from the watcher client to the Web system 14 by the cooperatively managed communication, and displays the status on the viewing screen in the Web system 14. The watcher client registered may thus readily grasp the change in the statuses. In particular, the change may be notified to all registered watchers by the above sequence of operations.

The entire disclosure of Japanese patent application Ser. No. 2004-136347, filed on Apr. 30, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A service providing method for transmitting information in a communication system, the communication system including a first system operating in accordance with a first protocol and a second system operating in accordance with a second protocol, the first system having two first clients,
a first CA (call attempt) manager,
a first cooperation manager,
and a SIP (Session Initiation Protocol) server, and the second system having a communication monitoring service application,
a second CA manager, and
a second cooperation manager, the method comprising:

requesting a task input frame from the communication monitoring service application in the second system, and displaying the task input frame;

selecting, by a user through the displayed task input frame, one of the first clients of the first system;

generating a second-system boot signal, including information of the selected first client, by the second CA manager of the second system, and sending the second-system boot signal to the second cooperation manager of the second system;

the second cooperation manager transforming the second-system boot signal into a CA request signal in accordance with a third protocol that is different from the first and second protocol and for communication between the first and second systems, and sending the CA request signal to the first cooperation manager of the first system;

the first cooperation manager generating a first-system boot signal based on the CA request signal, and sending the first-system boot signal to the first CA manager;

the first CA manager of the first system generating a call attempt upon receiving the first-system boot signal, and registering the generated call attempt;

upon completion of the registration of the generated call attempt, the first CA manager generating another first-system boot signal and sending the another first-system boot signal to the first cooperation manager;

the first cooperation manager, upon receiving the another first-system boot signal, sending a CA response signal to the second cooperation manager using the third protocol;

the second cooperation manager transforming the CA response signal into a second-system response signal in accordance with the second protocol, and sending the second-system response signal to the communication monitoring service application through the second CA manager;

displaying response data corresponding to the second-system response signal from the communication monitoring service application, designating a task via the task input frame, and registering a call attempt corresponding to the designated task through the communication monitoring service application; and transforming, by the second cooperation manager, a request of communication from the communication monitoring service application into a call request signal in accordance with the third protocol, and sending the call request signal to the first cooperation manager;

transforming, by the first cooperation manager, the call request signal into another call request signal in accordance with the first protocol;

sending the another call request signal to the SIP server in the first system, and connecting a communication between the selected first client and the other one of the two first clients corresponding to the user, based on the registered call attempt.

2. The method in accordance with claim 1, further comprising, at a time of termination of the communication between the two first clients:

one of the two first clients sending a termination signal to the first cooperation manager, through the SIP server;

the first cooperation manager transforming the termination signal into a first end notification signal in accordance with the third protocol, and sending the first end notification signal to the second cooperation manager;

the second cooperation manager transforming the first end notification signal into a second end notification signal in accordance with the second protocol, and sending the second end notification signal to an input image frame through the communication monitoring service application, and displaying the input image frame;

inputting a change of status via the displayed input image frame;

the second CA manager, in response to said inputting, supplying the change of status to the communication monitoring service application, which in turn activates the second cooperation manager;

the second cooperation manager sending a status set signal, in accordance with the third protocol, to the first cooperation manager of the first system;

the first cooperation manager transforming the status set signal into a launching signal in accordance with the first protocol, and sending the launching signal to the first CA manager;

the first CA manager changing the registration status of the communication according to the launching signal; and sending another launching signal to the first cooperation manager;

the first cooperation manager transforming the another launching signal into a first status response signal in accordance with the third protocol, sending the first status response signal to the second cooperation manager of the second system;

the second cooperation manager transforming the first status response signal into a second status response signal in accordance with the second protocol, and sending the second status response signal to the second CA manager;

the second CA manager, in response to the second status response signal, sending a third status response signal to the communication monitoring service application; and displaying data corresponding to the third status response signal via the communication monitoring service application.

3. The method in accordance with claim 1, further comprising:

inputting a re-request of a status in the second system, searching a history up to a current time in the second system, and when a match is found for a task corresponding to the re-request, the communication monitoring service application launches the second CA manager, which in turn launches the second cooperation manager;

the second cooperation manager sending a first end notification signal, in accordance with the third protocol, to the first cooperation manager of the first system;

the first cooperation manager, in response to the first end notification signal, sending a second end notification signal in accordance with the first protocol to the first CA manager;

the first CA manager retrieving an intended destination of a communication for the task from the second end notification signal, and launching the first cooperation manager;

the first cooperation manager, once launched, sending a search response signal in accordance with the third protocol to the second cooperation manager;

the second cooperation manager, in response to the search response signal, sending a first status response signal in accordance with the second protocol to the second call attempt manager, which in turn sends a first status result signal to the communication monitoring service application;

displaying data corresponding to the first status result signal as information describing a past request;

selecting a destination of communication from the displayed information, sending the selected destination of communication to the communication monitoring service application;

the communication monitoring service application sending the selected destination of communication to the SIP server through the second cooperation manager and the first cooperation manager, and setting up requested communication between the two first clients by the SIP server based on the selected destination of communication.

4. The method in accordance with claim 1, further comprising:

requesting, to the communication monitoring service application, a message to be sent, and displaying a message input image frame corresponding to the message request;

inputting the message as information in the displayed message input image frame, and registering the input message in the second system with the communication monitoring service application;

sending, to the second cooperation manager, a change of status of a call attempt due to the registration of the input message in the second system;

the second cooperation manager transforming the sent change of status into a first end notification signal in accordance with the third protocol, and sending the first end notification signal to the first cooperation manager;

the first cooperation manager transforming the first end notification signal into a second end notification signal in accordance with the first protocol, setting a status for a call attempt by the first call attempt manager based on the second end notification signal, registering the input message in the first system, and changing the status of the call attempt, based on the registration, with the first call attempt manager; and sending out a result of changing the status of the call attempt by the first call attempt manager to the first cooperation manager;

the first cooperation manager transforming the result of changing the status into a second status response signal in accordance with the third protocol, and sending the second status response signal to the second cooperation manager;

the second cooperation manager transforming the second status response signal into a third status response signal in accordance with the second protocol, and sending the third status response signal through the second call attempt manager to the communication monitoring service application; and displaying, via the communication monitoring service application, data corresponding to the third status response signal as the result of changing the status.

5. The method in accordance with claim 1, further comprising:

selecting a displayed message in the second system, requesting the communication monitoring service application to open the selected message, retrieving a registered message corresponding to the selection of the displayed message, and displaying the retrieved registered message by the communication monitoring service application;

sending an input change of status to the first call attempt manager sequentially through the second call attempt manager, the second cooperation manager, and the first cooperation manager, setting a status for a call attempt by the first call attempt manager based on the input change of status, registering the retrieved message in the first system, and changing the status of the call attempt based on the registration; and sending a result of the changing of the status of the call attempt by the first call attempt manager to the communication monitoring service application sequentially through the first cooperation manager, the second cooperation manager and the second call attempt manager, and displaying the result of the changing of the status of the call attempt via the communication monitoring service application.

6. The method in accordance with claim 1, further comprising:

requesting a voice recording as a message to the communication monitoring service application, subsequently displaying an input image frame corresponding to the message, sending a request of voice recording to the SIP server with the communication monitoring service application through the second cooperation manager and the first cooperation manager, booting a voice mail application to realize the request of voice recording, based on a boot signal that includes the request of voice recoding and that is supplied from the SIP server, for recording and reproducing a speech or voice signal consistent with the first protocol, to record a voice message;

sending a begin-recording message to one of the two first clients applicable to the request of voice recording in the first system, and inputting the voice message into the one of the two first clients applicable to the request of voice recording in the first system;

sending the input voice message from the one of the two first clients applicable to the request of voice recording in the first system to the voice mail application;

with the voice mail application, sending a response including the input voice message in response to the request of voice recoding to the communication monitoring service application through the first cooperation manager and the second cooperation manager; and registering the input voice message in the second system with the communication monitoring service application, and displaying a change of status according to completion of the voice recording with the communication monitoring service application.

7. The method in accordance with claim 1, further comprising:

retrieving a voice message registered in the second system with the communication monitoring service application, in response to a request for reproducing a speech, after displaying a voice message indicator on a monitor screen, when voice has been recorded as the voice message;

supplying a request for reproducing the voice message retrieved by the communication monitoring service application to a voice mail application for recording and reproducing a speech or voice signal in the first system sequentially through the second cooperation manager, the first cooperation manager and the SIP server, and booting the voice mail application; and reproducing the voice message in response to the booting of the voice mail application to send out the reproduced voice message to an applicable one of the two first clients in the first system.

8. The method in accordance with claim 1, further comprising:

selecting a requesting entity of a task from entities inputted and displayed after inputting the designation of the task, sending the selected requesting entity of the task to the communication monitoring service application, and registering the task and information of a call attempt in the second system with the communication monitoring service application;

sending a boot signal including a request for accessing a proxy user agent to a second service proxy user agent manager for operating and managing service proxy user agent information in the second system through the communication monitoring service application, sending the boot signal including the request of accessing the proxy user agent to a first service proxy user agent manager for operating and managing the service proxy user agent information managed in the first system, from the service proxy user agent manager through the second cooperation manager and the first cooperation manager, booting a proxy user agent generator, and generating the proxy user agent in the first system in response to the request of accessing the proxy user agent in the first system;

registering information of the generated proxy user agent in the first system; and sending a response including the information of the generated proxy user agent to the second service proxy user agent manager in the second system sequentially through the proxy user agent generator, the first service proxy user agent manager, the first cooperation manager and the second cooperation manager, in response to registration of the proxy user agent, and sending the response to the communication monitoring service application; and registering in the second system both the task and information of the call attempt included in the response via the communication monitoring service application, and setting up the communication to the two first clients of the first system with the communication monitoring service application.

9. The service providing method in accordance with claim 1, wherein the first protocol is a session initiation protocol, the second protocol is a hyper text transfer protocol, and the third protocol is SOAP (Simple Object Access Protocol) or CORBA (Common Object Request Broker Architecture) that can be handled by the first and second protocols.

* * * * *